(12) United States Patent
Ogasawara et al.

(10) Patent No.: US 12,505,597 B2
(45) Date of Patent: Dec. 23, 2025

(54) INFORMATION PROCESSING APPARATUS AND METHOD FOR CONTROLLING THE SAME

(71) Applicant: CANON KABUSHIKI KAISHA, Tokyo (JP)

(72) Inventors: Kazuya Ogasawara, Kanagawa (JP); Takayuki Yamada, Kanagawa (JP); Kouta Murasawa, Kanagawa (JP); Shinjiro Hori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 151 days.

(21) Appl. No.: 18/342,364

(22) Filed: Jun. 27, 2023

(65) Prior Publication Data
US 2023/0419573 A1    Dec. 28, 2023

(30) Foreign Application Priority Data
Jun. 28, 2022 (JP) ................................ 2022-104047

(51) Int. Cl.
G06T 11/60 (2006.01)
G06T 7/00 (2017.01)
G06T 7/11 (2017.01)

(52) U.S. Cl.
CPC ............ *G06T 11/60* (2013.01); *G06T 7/0002* (2013.01); *G06T 7/11* (2017.01); *G06T 2200/24* (2013.01)

(58) Field of Classification Search
CPC ......... G06T 11/60; G06T 7/0002; G06T 7/11; G06T 2200/24
USPC ................................................. 345/646, 645
See application file for complete search history.

(56) References Cited

U.S. PATENT DOCUMENTS

| | | | |
|---|---|---|---|
| 10,679,103 B2* | 6/2020 | Kondo | G06V 10/87 |
| 11,216,998 B2* | 1/2022 | Tagra | G06T 7/90 |
| 2003/0137541 A1 | 7/2003 | Massengale | |
| 2004/0075669 A1 | 4/2004 | Bronstein | |
| 2006/0181736 A1 | 8/2006 | Quek | |
| 2008/0222560 A1 | 9/2008 | Harrison | |
| 2011/0016385 A1* | 1/2011 | Kasuga | H04N 1/3872 715/243 |
| 2015/0278163 A1* | 10/2015 | Kinkoh | G06F 40/106 715/244 |
| 2015/0348249 A1* | 12/2015 | Yamamoto | G06F 3/04847 382/218 |
| 2016/0063746 A1 | 3/2016 | Furuya | |
| 2016/0173944 A1* | 6/2016 | Kilar | H04N 21/234327 725/12 |
| 2017/0352083 A1* | 12/2017 | Ruck | G06Q 10/1093 |
| 2018/0268586 A1 | 9/2018 | Furuya | |
| 2019/0371027 A1* | 12/2019 | Noguchi | G06T 11/60 |

(Continued)

FOREIGN PATENT DOCUMENTS

| | | |
|---|---|---|
| JP | 2010033551 A | 2/2010 |
| JP | 2016048408 A | 4/2016 |
| JP | 6537419 B2 | 7/2019 |

(Continued)

*Primary Examiner* — Sheree N Brown
(74) *Attorney, Agent, or Firm* — Canon U.S.A., Inc. IP Division

(57) ABSTRACT

Characters are acquired. An input of aimed impression is received. Based on the aimed impression, a character decoration method is determined. Based on the determined character decoration method and based on the characters, the poster is created.

11 Claims, 27 Drawing Sheets

(56) References Cited

U.S. PATENT DOCUMENTS

2023/0070390 A1* 3/2023 Weng .................... G06F 40/103
2023/0080407 A1* 3/2023 Kumar .................. G06F 40/166
                                                            715/717

FOREIGN PATENT DOCUMENTS

| JP | 2020046994 A | 3/2020 |
| JP | 6958096 B2 | 11/2021 |
| WO | 2015129328 A1 | 9/2015 |

* cited by examiner

FIG. 4

| COLOR ARRANGEMENT ID | COLOR 1 | COLOR 2 | COLOR 3 | COLOR 4 |
|---|---|---|---|---|
| 1 | (0, 0, 0) | (12, 66, 113) | (10, 129, 171) | (249, 223, 220) |
| 2 | (0, 48, 63) | (205, 172, 129) | (202, 228, 219) | (245, 244, 244) |
| 3 | (0, 168, 204) | (12, 123, 147) | (39, 73, 109) | (20, 40, 80) |
| 4 | (2, 2, 5) | (228, 58, 25) | (242, 244, 247) | (17, 31, 77) |

⋮

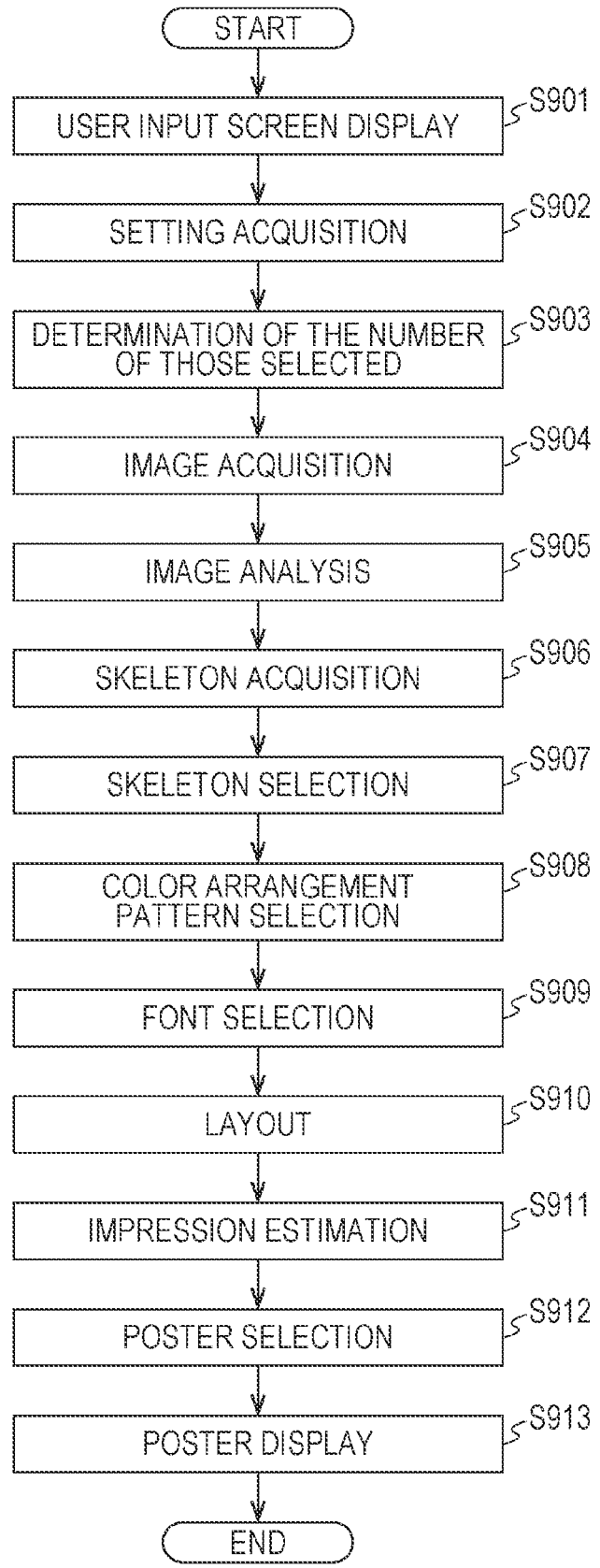

| SKELETON NAME | SENSE OF LUXURY | SENSE OF AFFINITY | SENSE OF DYNAMISM | SENSE OF MASSIVENESS |
|---|---|---|---|---|
| SKELETON 1 | −1 | −1 | −2 | 0 |
| SKELETON 2 | −1 | +2 | +1 | −2 |
| SKELETON 3 | 0 | −1 | +2 | +1 |
| SKELETON 4 | +1 | −2 | −2 | +2 |

| SKELETON NAME | DISTANCE |
|---|---|
| SKELETON 1 | 2.8 |
| SKELETON 2 | 4.7 |
| SKELETON 3 | 4.2 |
| SKELETON 4 | 1 |

FIG. 11A

| COLOR ARRANGEMENT ID | COLOR 1 | COLOR 2 | COLOR 3 | COLOR 4 | SENSE OF LUXURY | SENSE OF AFFINITY | SENSE OF DYNAMISM | SENSE OF MASSIVENESS |
|---|---|---|---|---|---|---|---|---|
| 1 | (0, 68, 69) | (44, 120, 108) | (250, 245, 228) | (248, 180, 0) | -1 | +1 | -2 | +2 |
| 2 | (157, 37, 3) | (223, 133, 67) | (241, 241, 176) | (127, 169, 151) | -2 | 0 | +2 | +1 |
| 3 | (245, 176, 203) | (213, 151, 206) | (116, 92, 151) | (57, 55, 91) | +2 | 0 | -1 | -1 |
| 4 | (255, 255, 199) | (169, 241, 223) | (30, 174, 152) | (35, 62, 139) | +1 | +2 | -1 | -2 |

| FONT ID | TITLE FONT | TEXT-BODY FONT | SENSE OF LUXURY | SENSE OF AFFINITY | SENSE OF DYNAMISM | SENSE OF MASSIVENESS |
|---|---|---|---|---|---|---|
| 1 | FONT 5 | FONT 2 | -1 | +2 | +2 | -1 |
| 2 | FONT 8 | FONT 1 | +2 | +2 | +1 | -2 |
| 3 | FONT 12 | FONT 1 | +1 | +1 | -1 | +1 |
| 4 | FONT 6 | FONT 1 | +1 | -1 | 0 | 0 |

...

| SETTING ITEM | SETTING CONTENT |
|---|---|
| TITLE | GREAT APPRECIATION SUMMER SALE |
| SUB-TITLE | BEAT THE MID-SUMMER HEAT! |
| TEXT | (NO SETTING MADE) |
| IMAGE |  1401 |

| COLOR ARRANGEMENT ID | COLOR 1 | COLOR 2 | COLOR 3 | COLOR 4 |
|---|---|---|---|---|
| 1 | (0, 68, 69) | (44, 120, 108) | (250, 245, 228) | (248, 180, 0) |
| 4 | (255, 255, 199) | (169, 241, 223) | (30, 174, 152) | (35, 62, 139) |

| FONT ID | TITLE FONT | TEXT-BODY FONT |
|---|---|---|
| 2 | FONT 8 | FONT 1 |
| 3 | FONT 12 | FONT 1 |

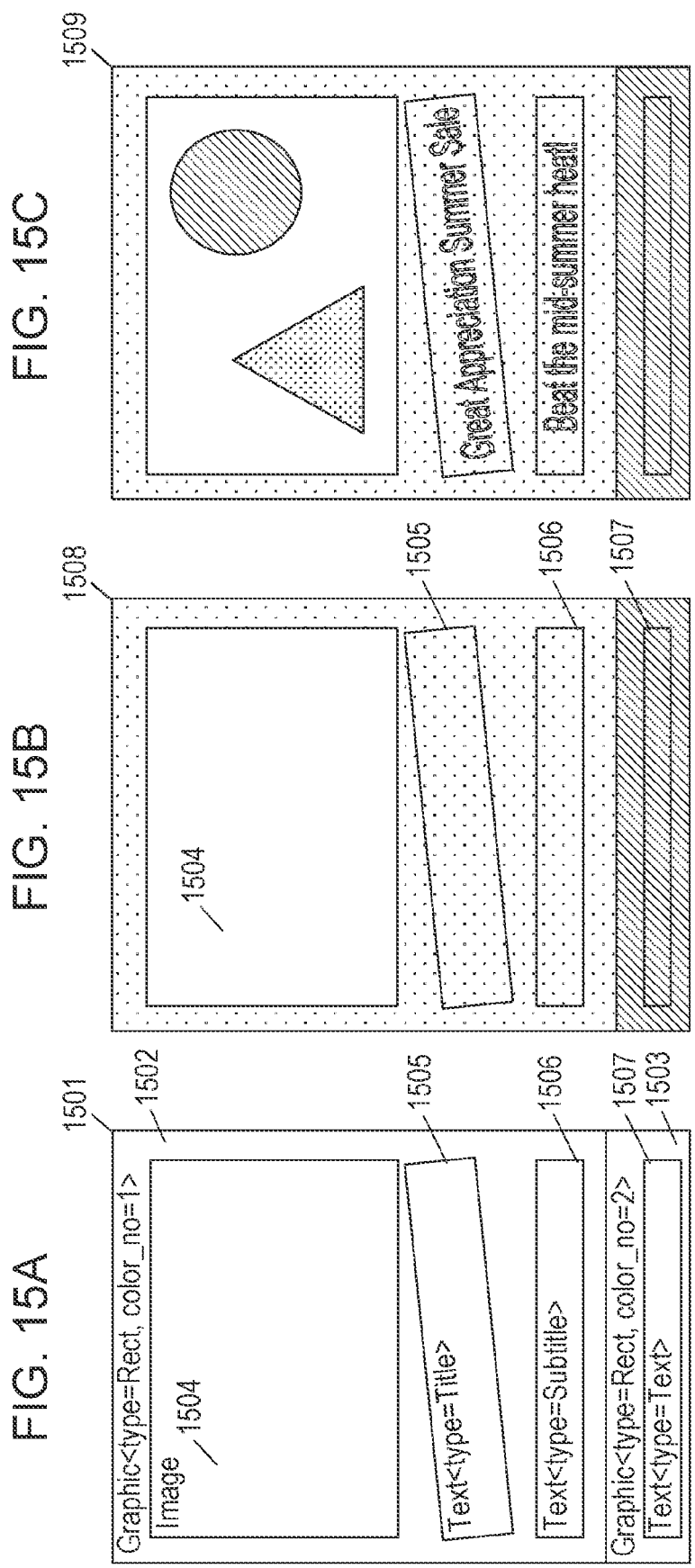

FIG. 16A
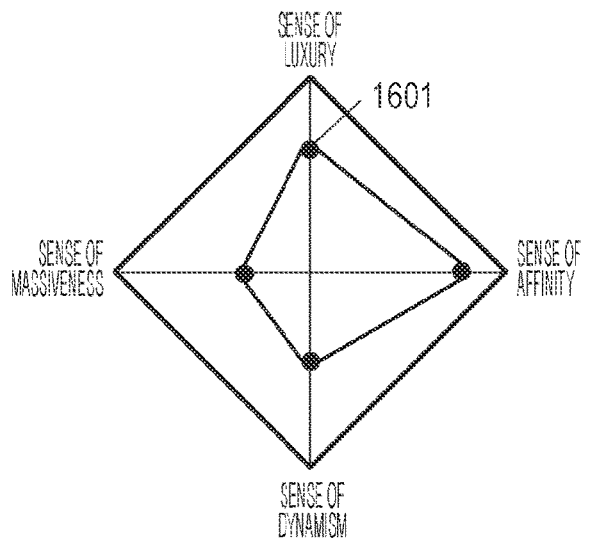
FIG. 16B
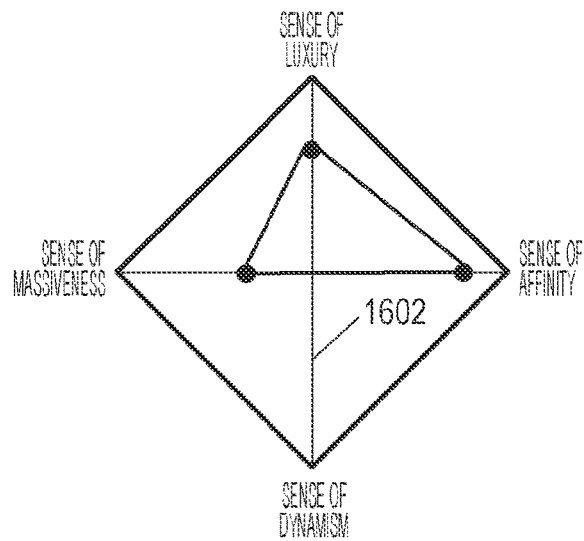
FIG. 16C
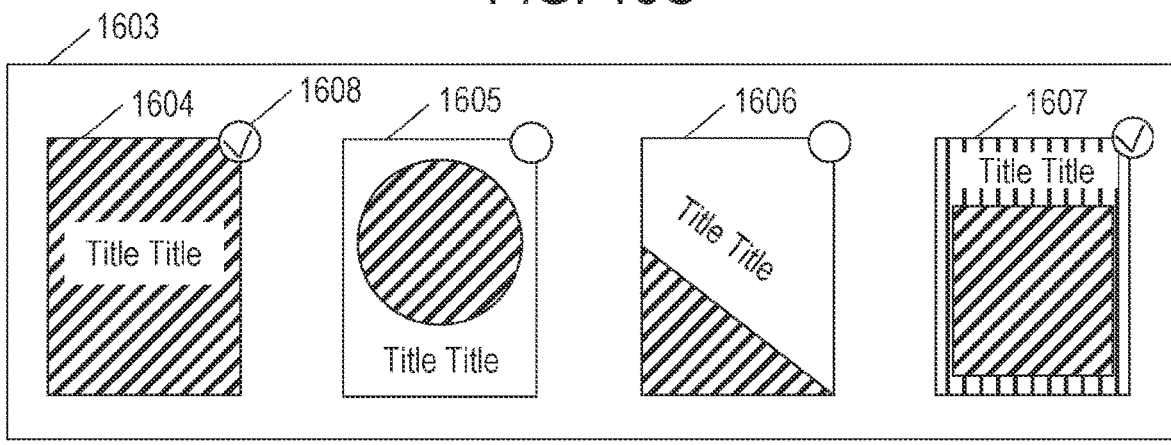
FIG. 16D
| POSTER | SELECTED STATE | SENSE OF LUXURY | SENSE OF AFFINITY | SENSE OF DYNAMISM | SENSE OF MASSIVENESS |
|---|---|---|---|---|---|
| 1604 | ✓ | +2 | −0.5 | −0.1 | +0.1 |
| 1605 |  | 0 | +2 | +0.1 | −0.2 |
| 1606 |  | +0.4 | −0.1 | +2 | +0.2 |
| 1607 | ✓ | −0.1 | 0 | +0.3 | +2 |
| AIMED IMPRESSION |  | +2 | −0.5 | +0.3 | +2 |

| CHARACTER DECORATION METHOD | SENSE OF LUXURY | SENSE OF AFFINITY | SENSE OF DYNAMISM | SENSE OF MASSIVENESS |
|---|---|---|---|---|
| CONTOUR | -2 | +2 | +1 | 0 |
| LUSTER | +2 | -1 | -2 | +1 |
| SHADOW | +1 | -1 | +2 | 0 |
| BOLDFACE | -2 | +2 | 0 | +1 |

INFORMATION PROCESSING APPARATUS AND METHOD FOR CONTROLLING THE SAME

BACKGROUND OF THE DISCLOSURE

Field of the Disclosure

The present disclosure relates to a technique for creating a poster.

Description of the Related Art

In related art, the following method for creating a poster has been proposed. A template that contains information such as shapes and layouts of images, characters, graphics and the like that are poster-constituting elements has been prepared in advance. The images, the characters, the graphics and the like are arranged in accordance with the template, thereby creating a poster.

Japanese Patent Laid-Open No. 2020-046994 discloses a technique of, in a case where an impression of character image data will change if a color of characters is changed, decoration of the characters (hereinafter referred to as "character decoration") is changed without changing the color of the characters, thereby guaranteeing readability while maintaining the impression of the character image data.

However, in Japanese Patent Laid-Open No. 2020-046994, no consideration is given to appropriately creating a poster that expresses an impression intended by a user, even in a case where character decoration is changed.

SUMMARY OF THE DISCLOSURE

Embodiments of the present disclosure makes it possible to appropriately create a poster that expresses an impression intended by a user, even in a case where character decoration is performed.

An information processing apparatus according to an aspect of the present disclosure includes at least one processor, and a memory that stores a program which, when executed by the at least one processor, causes the at least one processor to function as: a character acquisition unit configured to acquire characters; a receiving unit configured to receive an input of aimed impression; and a poster creation unit configured to, based on the characters and the aimed impression, create a poster, wherein based on the aimed impression, the poster creation unit determines a method for decorating the characters, and based on the determined method for decorating the characters and based on the characters, the poster creation unit creates the poster.

Further features of the present disclosure will become apparent from the following description of exemplary embodiments with reference to the attached drawings.

BRIEF DESCRIPTION OF THE DRAWINGS

FIG. 4 is a diagram for explaining color arrangement patterns.

FIG. 9 is a flowchart illustrating poster creation processing.
FIG. 11A is a diagram for explaining color arrangement patterns.
FIG. 11B is a diagram for explaining a method for font selection.
FIG. 15A is a diagram for explaining operation of the layout unit.
FIG. 15B is a diagram for explaining operation of the layout unit.
FIG. 15C is a diagram for explaining operation of the layout unit.
FIG. 16A is a diagram illustrating an example of an aimed impression designating unit.
FIG. 16B is a diagram illustrating an example of the aimed impression designating unit.
FIG. 16C is a diagram illustrating an example of the aimed impression designating unit.
FIG. 16D is a diagram illustrating an example of the aimed impression designating unit.

DESCRIPTION OF THE EMBODIMENTS

Figure 1:
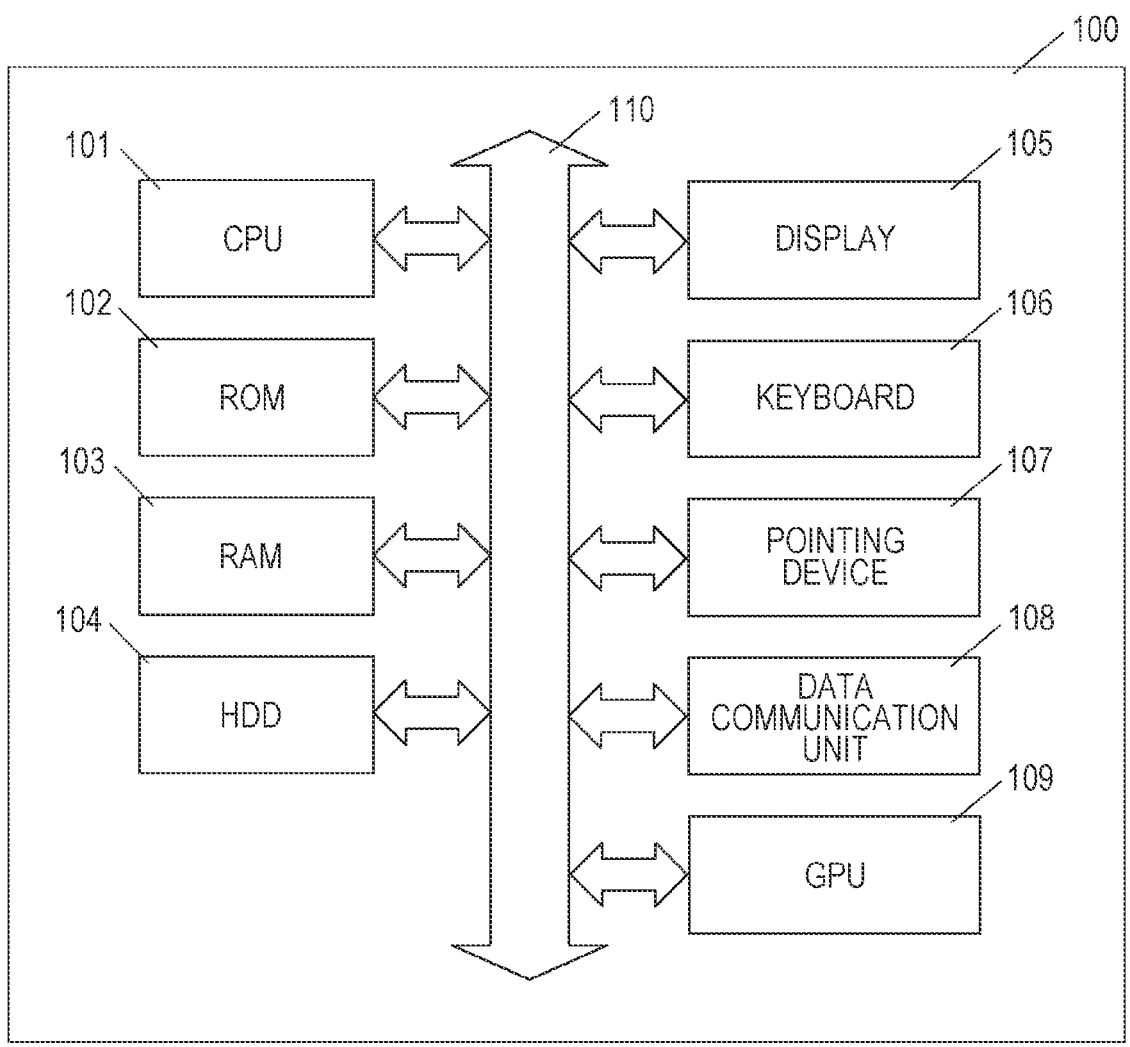
FIG. 1 is a block diagram illustrating a configuration of hardware of an information processing apparatus.

With reference to the accompanying drawings, some embodiments of the present disclosure will now be explained in detail. The embodiments described below shall not be construed to limit the present disclosure recited in the appended claims. Not all of the features described in the embodiments are necessarily required to be combined for providing a solution proposed in the present disclosure. The same reference numerals will be assigned to the same components, and the same explanation will not be repeated.

First Embodiment

In the present embodiment, a method for creating a poster automatically by running an application (hereinafter referred to also as "app") for poster creation in an information processing apparatus will be described as an example. In the description below, the meaning of the term "image" encompasses a still image, and a frame image clipped out of a moving image, unless otherwise specified.

FIG. 1 is a block diagram illustrating a configuration of hardware of an information processing apparatus. An information processing apparatus 100 is, for example, a personal computer (hereinafter abbreviated as "PC"), a smartphone, or the like. In the present embodiment, it is assumed that the information processing apparatus is a PC. The information processing apparatus 100 includes a CPU 101, a ROM 102, a RAM 103, an HDD 104, a display 105, a keyboard 106, a pointing device 107, a data communication unit 108, and a GPU 109.

The CPU (central processing unit/processor) 101 performs central control on the information processing apparatus 100 and realizes operation of the present embodiment by, for example, reading a program stored in the ROM 102 out into the RAM 103 and running the program. Though a single CPU only is illustrated in FIG. 1, it may be comprised of a plurality of CPUs. The ROM 102 is a general-purpose ROM, and, for example, programs to be run by the CPU 101 are stored therein. The RAM 103 is a general-purpose RAM, and, for example, is used as a working memory for temporarily storing various kinds of information during program execution by the CPU 101. The HDD (hard disk drive) 104 is a storage medium (storage unit) configured to store image files, databases storing processing results of image analysis and the like, and skeletons to be used by a poster creation application and the like.

The display 105 is a display unit configured to serve as a user interface (UI) according to the present embodiment and display electronic posters as layout results of image data (hereinafter referred to also as "image"). Though not illustrated, a display control unit configured to control display on the display unit is also included therein. The keyboard 106 and the pointing device 107 receive instructions from a user who operate them.

The display 105 may have a touch sensor function. The keyboard 106 is used when, for example, the user inputs the number of spread pages of a poster which the user wants to create on a UI displayed on the display 105. The pointing device 107 is used when, for example, the user clicks a button on the UI displayed on the display 105.

The data communication unit 108 performs communication with an external device via a wired network, a wireless network, or the like. For example, the data communication unit 108 transmits, to a printer or a server that is capable of communicating with the information processing apparatus 100, layout data obtained by using an automatic layout function. The data bus 110 connects the block components illustrated in FIG. 1 such that interconnected communication can be performed therebetween.

The configuration illustrated in FIG. 1 is just an example, and the scope of the present disclosure is not limited to this example. For example, the display 105 may be omitted, and the information processing apparatus 100 may be configured to display the UI on an external display.

The poster creation application according to the present embodiment is stored in the HDD 104. As will be described later, the poster creation application according to the present embodiment is launched when the user performs an operation of selecting an icon of this application displayed on the display 105 by using the pointing device 107 and then clicking or double-clicking it.

Figure 2:
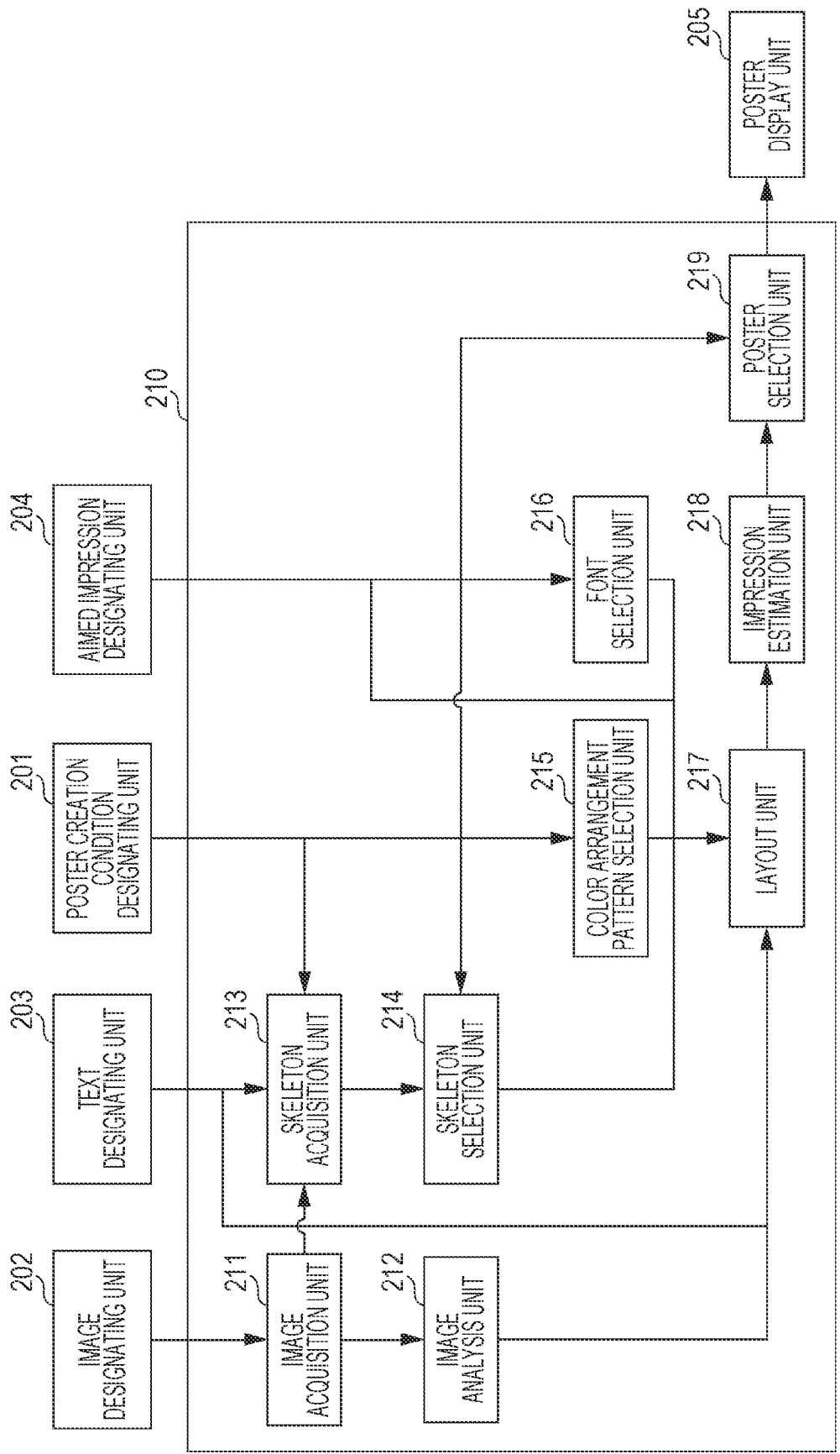
FIG. 2 is a software block diagram of a poster creation application.

FIG. 2 is a software block diagram of the poster creation application. The poster creation application includes a poster creation condition designating unit 201, an image designating unit 202, a text designating unit (text acquisition unit) 203, an aimed impression designating unit 204, a poster display unit 205, and a poster creation unit 210. The poster creation unit 210 includes an image acquisition unit 211, an image analysis unit 212, a skeleton acquisition unit 213, a skeleton selection unit 214, a color arrangement pattern selection unit 215, a font selection unit 216, a layout unit 217, an impression estimation unit 218, and a poster selection unit 219.

Program modules that correspond respectively to the components illustrated in FIG. 2 are included in the poster creation application described above. The CPU 101 executes each of these program modules. By this means, the CPU 101 functions as each of the components illustrated in FIG. 2. To explain the components illustrated in FIG. 2, it is assumed in the description below that these components perform various kinds of processing. The software block configuration illustrated in FIG. 2 is especially focused on the poster creation unit 210 that executes an automatic poster creation function.

The poster creation condition designating unit 201 specifies poster creation conditions to the poster creation unit 210 in accordance with UI operation performed using the pointing device 107. In the present embodiment, a poster size, the number of those to be created, and a use category are specified as the poster creation conditions. Actual dimension values including a width value and a height value may be specified as the poster size. A paper size such as A1 or A2 may be specified instead. The use category indicates what kind of use the poster is intended for, for example, for restaurant use, for school-event announcement, for sales promotion, or the like.

The text designating unit 203 designates character information to be arranged on the poster in accordance with UI operation performed using the keyboard 106. The character information to be arranged on the poster means, for example, character strings that represent a title, time and date, a place, and the like. The text designating unit 203 outputs, to the skeleton acquisition unit 213 and the layout unit 217, each character information in an associated manner such that it is identifiable what kind of information the character information is, such as the title, the time and date, the place.

The image designating unit 202 designates a group of images to be arranged on the poster. The group of images is stored in the HDD 104. The group of images may be designated based on, for example, the structure of a file system including images as in a device or directory or the like, may be designated based on accompanying information of individual images such as the time and date of capturing, or may be designated based on attribute information. The image designating unit 202 outputs file paths to the designated images to an image acquisition unit 211.

The aimed impression designating unit 204 designates the aimed impression of the poster to be created. The aimed impression is an impression that the poster that will have been created should finally give. In the present embodiment, by performing UI operation using the pointing device 107, the user specifies, for each word that represents an impression, the degree of strength of an impression that the poster should give. A detailed explanation of an impression will be given later.

The image acquisition unit 211 acquires the group of images designated by the image designating unit 202 from the HDD 104. The image acquisition unit 211 outputs the acquired image data to the image analysis unit 212. In addition, the image acquisition unit 211 outputs the number of acquired images to the skeleton acquisition unit 213. Examples of the images stored in the HDD 104 are a still image, and a frame image clipped out of a moving image. The still image and the frame image are acquired from an image-capturing device such as a digital camera, a smartphone, etc. The image-capturing device may be included in the information processing apparatus 100, or in an external device. If the image-capturing device is an external image-capturing device, the images are acquired via the data communication unit 108. As another example, the still image may be an illustration image created using image editing software or a CG image created using CG production software. The still image and the clipped-out image may be images acquired from a network or a server via the data communication unit 108. An example of the image acquired from a network or a server is a social networking service image (hereinafter referred to as "SNS" image"). The program run by the CPU 101 performs, for each image, analysis of data affixed to the image and determines a storage source. The acquisition source of an SNS image may be managed in an application by performing image acquisition from SNS via the application. The images are not limited to those described above, and may be any other kind of image.

The image analysis unit 212 performs image feature amount acquisition by analyzing the image data acquired from the image acquisition unit 211 by using an image analysis method that will be described later. As the analysis processing, object recognition is performed to acquire the image feature amount. The image analysis unit 212 outputs the image data, with the image feature amount associated therewith, to the layout unit 217.

The skeleton acquisition unit 213 acquires, from the HDD 104, a group of skeletons that meet the conditions designated by the poster creation condition designating unit 201, the text designating unit 203, and the image acquisition unit 211. In the present embodiment, a skeleton means information that represents the layout of a character string(s), an image (s), a graphic(s), and the like that are to be arranged on a poster.

FIG. 3A is a diagram illustrating an example of a skeleton. On a skeleton 301 illustrated in FIG. 3A, three graphic objects 302, 303, and 304, one image object 305, and four text objects 306, 307, 308, and 309 are arranged. Metadata that is necessary for creating a poster is also stored in each object, in addition to a position that indicates where to be placed, a size, and an angle. FIG. 3B is a diagram illustrating an example of metadata. For example, the text objects 306, 307, 308, and 309 have information specifying what kinds of character information are to be arranged as the metadata. In this example, the text object 306 indicates that a title is placed here, the text object 307 indicates that a sub-title is placed here, and the text objects 308 and 309 indicate that text bodies are placed here. The text objects 306, 307, 308, and 309 have information specifying font sizes and the number of lines as the metadata. In the present embodiment, it is assumed that every text object has information specifying one line. The graphic objects 302, 303, and 304 have information about graphic shapes and color arrangement numbers as the metadata. In this example, the graphic objects 302 and 303 indicate rectangles, and the graphic object 304 indicates an ellipse. Color Arrangement Number 1 is assigned to the graphic object 302. Color Arrangement Number 2 is assigned to the graphic objects 303 and 304. The color arrangement number mentioned here is information that is referred to when performing color arrangement, which will be described later. Different color arrangement numbers indicate that different colors are assigned thereto. The types of objects and the metadata are not limited to the examples described above. For example, the objects may include a map object for placing a map thereat, a QR Code®, a barcode object for placing a barcode thereat, or the like. The metadata of the text objects may include metadata that indicates a line-to-line width or a character-to-character width. The intended use of the skeleton may be contained in the metadata so as to be used for controlling whether it is OK to use this skeleton, depending on the use.

The skeleton may be stored in the HDD 104 in, for example, a CSV format, or a DB format such as an SQL. The skeleton acquisition unit 213 outputs a group of skeletons acquired from the HDD 104 to the skeleton selection unit 214. The aimed impression varies as the following factors in the skeleton vary: an image layout position(s), a text layout position(s), a graphic layout position(s), a character font(s), color arrangement, graphics, and the like.

The skeleton selection unit 214 selects a group of skeletons matching with the aimed impression designated by the aimed impression designating unit 204 from among the skeletons acquired from the skeleton acquisition unit 213. Since the layout of a poster as a whole depends on the skeleton, preparing various kinds of skeleton in advance makes it possible to increase a variety of posters that can be created.

The color arrangement pattern selection unit 215 acquires a group of color arrangement patterns matching with the aimed impression designated by the aimed impression designating unit 204 from the HDD 104, and outputs the acquired group of color arrangement patterns to the layout unit 217. A color arrangement pattern is a combination of colors to be used in the poster.

FIG. 4 is a diagram illustrating an example of a table of color arrangement patterns. In the present embodiment, a color arrangement pattern represents a combination of four colors. Each number included in the column of color arrangement ID is an ID number for uniquely identifying the corresponding color pattern. Each column "Color 1" to "Color 4" shows each color value in 0 to 255 in the order of R, G, and B. Though a color arrangement pattern made up of four colors is used in the present embodiment, any other number of colors may be adopted, and two or more different numbers of colors may be adopted in a mixed manner.

The font selection unit 216 acquires a group of fonts matching with the aimed impression designated by the aimed impression designating unit 204 from the HDD 104, and outputs the acquired group of fonts to the layout unit 217.

The layout unit 217 generates pieces of poster data by performing layout processing of various kinds of data on each skeleton acquired from the skeleton selection unit 214. The layout unit 217 arranges the text acquired from the text designating unit 203 and the image data acquired from the image analysis unit 212 on each skeleton, and applies the color arrangement pattern acquired from the color arrangement pattern selection unit 215 thereto. In addition, the layout unit 217 performs control to apply character decoration thereto based on the aimed impression acquired from the aimed impression designating unit 204. The layout unit 217 outputs the generated group of poster data to the impression estimation unit 218.

The impression estimation unit 218 estimates the impression of each of the pieces of poster data acquired from the layout unit 217, and associates, with each of the pieces of poster data, the estimated impression corresponding thereto. The impression estimation unit 218 outputs the estimated impression associated with each of the pieces of poster data to the poster selection unit 219.

The poster selection unit 219 compares the aimed impression designated by the aimed impression designating unit 204 with the estimated impression acquired from the impression estimation unit 218, and selects poster data that gives an estimated impression that is closest to the aimed impression. The selection result is stored into the HDD 104. The poster selection unit 219 outputs the selected poster data to the poster display unit 205.

The poster display unit 205 outputs a poster image(s) to be displayed on the display 105 in accordance with the poster data acquired from the poster selection unit 219. The poster image is, for example, bitmap data. The poster display unit 205 displays the poster image on the display 105.

When the poster creation application has been installed in the information processing apparatus 100, a start icon is displayed on the home screen (desktop) of an operating system (OS) running on the information processing apparatus 100. When the user operates the pointing device 107 to double-click the start icon displayed on the display 105, the program stored in the HDD 104 is loaded into the RAM 103 and is launched due to execution by the CPU 101.

Though not illustrated, the poster creation application may have an additional function of accepting an additional input(s) made by the user after the display of a creation result(s) by the poster display unit 205 so as to enable editing of the arrangement, a color(s), a shape(s), and/or the like of an image(s), a text(s), and a graphic(s), thereby changing the design to bring it closer to what is demanded by the user.

If there is a print function of printing out the poster data stored in the HDD 104 by a printer under conditions specified by the poster creation condition designating unit 201, the user will be able to obtain a print output(s) of the created poster(s).

Example of Display Screen

Figure 5:
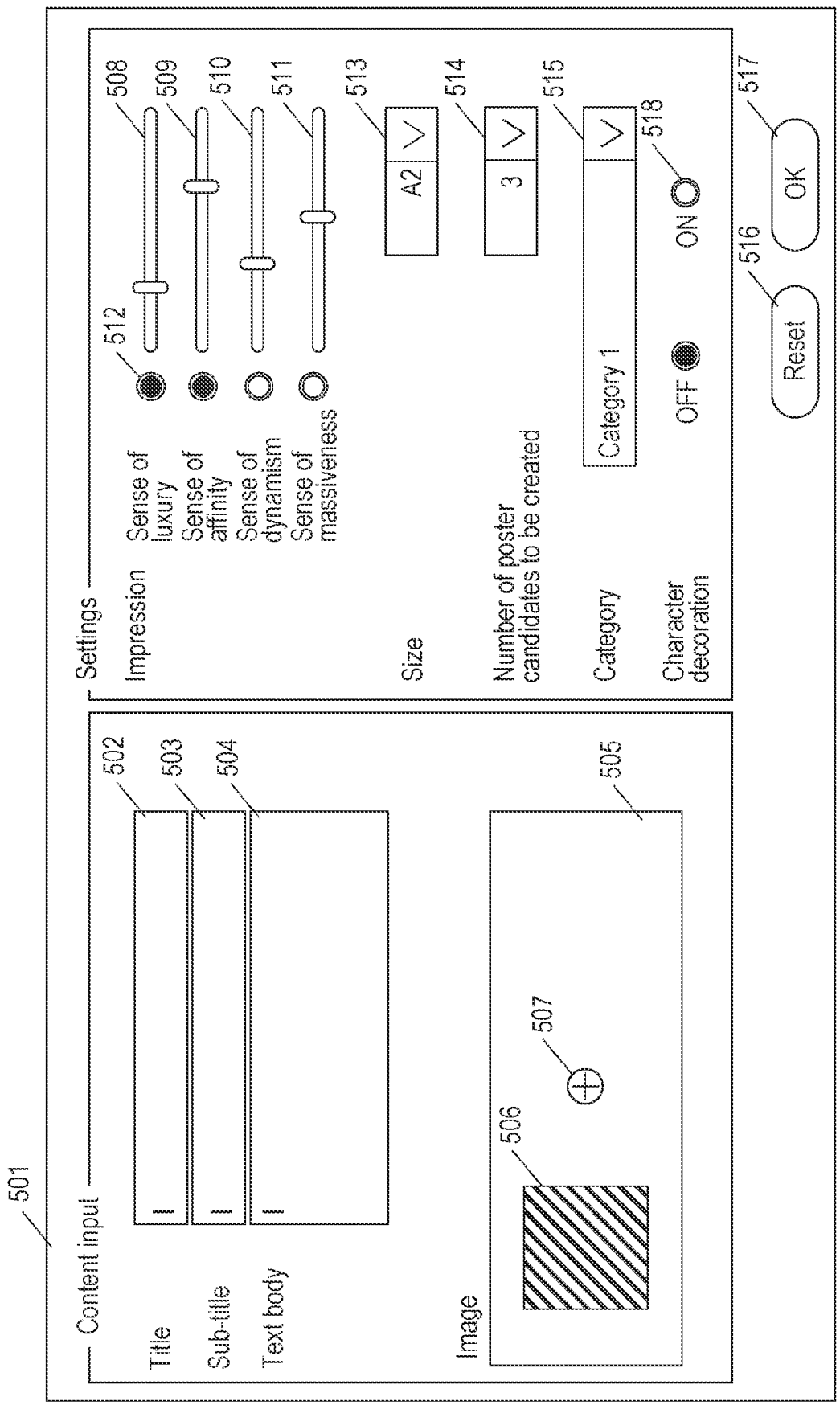
FIG. 5 is a diagram illustrating a display screen presented by the poster creation application.

FIG. 5 is a diagram illustrating an example of an app screen 501 presented by the poster creation application. The app screen 501 (a first screen) is a screen that is displayed on the display 105 and receives inputs of an aimed impression from the user when the application runs. The user sets poster creation conditions that will be described later, texts, and images via the app screen 501, and the poster creation condition designating unit 201, the image designating unit 202, and the text designating unit 203 acquire the content of settings from the user via this UI screen.

A title box 502, a sub-title box 503, and a text body box 504 accept designation of character information to be arranged on the poster. Though designation of three kinds of character information are accepted in the present embodiment, the scope of the present disclosure is not limited to this example. For example, designation of additional character information such as place and time and date may be accepted. Designation in all of these boxes is not indispensable. Some of the boxes may be left blank.

An image designation area 505 is an area to display an image(s) to be arranged on the poster. An image 506 is a thumbnail of the designated image. An "Add an image" button 507 is a button for adding an image to be arranged on the poster. When the "Add an image" button 507 is clicked by the user, the image designating unit 202 displays a dialog screen for selecting a file from among those stored in the HDD 104 and accepts an image-file selection made by the user. A thumbnail of the selected image is additionally displayed at the position 507 in the image designation area.

Impression sliders 508 to 511 are sliders for setting the aimed impression of the poster to be created. For example, the reference numeral 508 denotes a slider for setting the aimed level regarding a sense of luxury. With this slider, the user is able to set the aimed impression such that the poster that will have been created will give a higher level of a sense of luxury as the set position of this slider goes rightward and will give a lower level of a sense of luxury (less expensive, cheaper) as the set position of this slider goes leftward. If, for example, the user sets the impression slider 508 to a right-side position and the impression slider 511 to a left-side position, that is, if the set level of luxury is high and if the set level of massiveness is low, the poster that will have been created will have an elegant look. On the other hand, if the user sets the impression slider 511 to a right-side position while keeping the impression slider 508 at the right-side position, that is, if both the set level of luxury and the set level of massiveness are high, the poster that will have been created will have a gorgeous look. As described here, combining a plurality of impression sliders makes it possible to make a variety of impression settings different in orientation as to what kind of impression is aimed for, even for the same theme of impression such as a sense of luxury.

Radio buttons 512 are used for controlling ON/OFF settings of the respective items of aimed impression. FIG. 5 illustrates a state in which items "a sense of luxury" and "a sense of affinity" are ON and items "a sense of dynamism" and "a sense of massiveness" are OFF. If the user sets a certain radio button 512 OFF, the item of impression corresponding to this radio button is excluded from impression control. For example, a user who wants to create a poster that has a calm atmosphere with a low level of a sense of dynamism and demands nothing about the other items of impression is able to create such a poster focusing on low dynamism by setting the radio buttons 512 OFF, except for the one corresponding to "a sense of dynamism". This realizes control with a high degree of flexibility such as using all of the items of the aimed impression or using only some of them for creating the poster.

A size list box 513 is a list box for setting the size of the poster to be created. In response to a click operation performed by the user operating the pointing device 107, a list of available poster sizes is displayed, and the user is able to select a size from among them.

A number-of-those-created box 514 is a box in which the user is able to set the number of candidates for the poster to be created.

A category list box 515 is a list box in which the user is able to set the use category of the poster to be created.

A reset button 516 is a button for resetting each setting information on the app screen 501.

A character decoration radio button 518 is a radio button for setting whether to perform character decoration automatically or not. If the character decoration radio button 518 is ON, the poster creation unit 210 is allowed to perform character decoration automatically. Even if this radio button is ON, character decoration is not performed in a case where it is determined that no character decoration is needed at the poster creation unit 210. If the character decoration radio button 518 is OFF, the character decoration processing is skipped at the poster creation unit 210.

When an OK button 517 is clicked by the user, the poster creation condition designating unit 201, the text designating unit 203, the image designating unit 202, and the aimed impression designating unit 204 output the content of settings on the app screen 501 to the poster creation unit 210. When acquiring the content of settings, the poster creation condition designating unit 201 acquires the size of the poster to be created from the size list box 513, the number of candidates for the poster to be created from the number-of-those-created box 514, and the use category of the poster to be created from the category list box 515. The text designating unit 203 acquires character information to be arranged on the poster from the title box 502, the sub-title box 503, and the text body box 504. The image designating unit 202 acquires a file path(s) for the image(s) to be arranged on the poster from the image designation area 505. The aimed impression designating unit 204 acquires the aimed impression of the poster to be created from the impression sliders 508 to 511 and the radio buttons 512. The poster creation condition designating unit 201, the text designating unit 203, the image designating unit 202, and the aimed impression designating unit 204 may edit the values set on the app screen 501. For example, the text designating unit 203 may remove an unnecessary blank space from the head or the tail of the inputted character information. The aimed impression designating unit 204 may perform shaping on the values having been set using the impression sliders 508 to 511. In the present embodiment, shaping to integer values from −2 to +2 is performed, wherein a state in which the slider has been set to the leftmost position corresponds to −2, and a state in which the slider has been set to the rightmost position corresponds to +2. The correspondences between the values and the levels of the impression are as follows: −2 corresponds to "low"; −1 corresponds to "somewhat low", 0 corresponds to "neutral", +1 corresponds to "somewhat high", and +2 corresponds to "high". The reason why the shaping to −2 to +2 is performed is to make it easier to perform distance calculation by matching in scale with estimated impression that will be described later. This is a non-limiting example. Normalization as in 0 to 1 may be performed.

Figure 6:
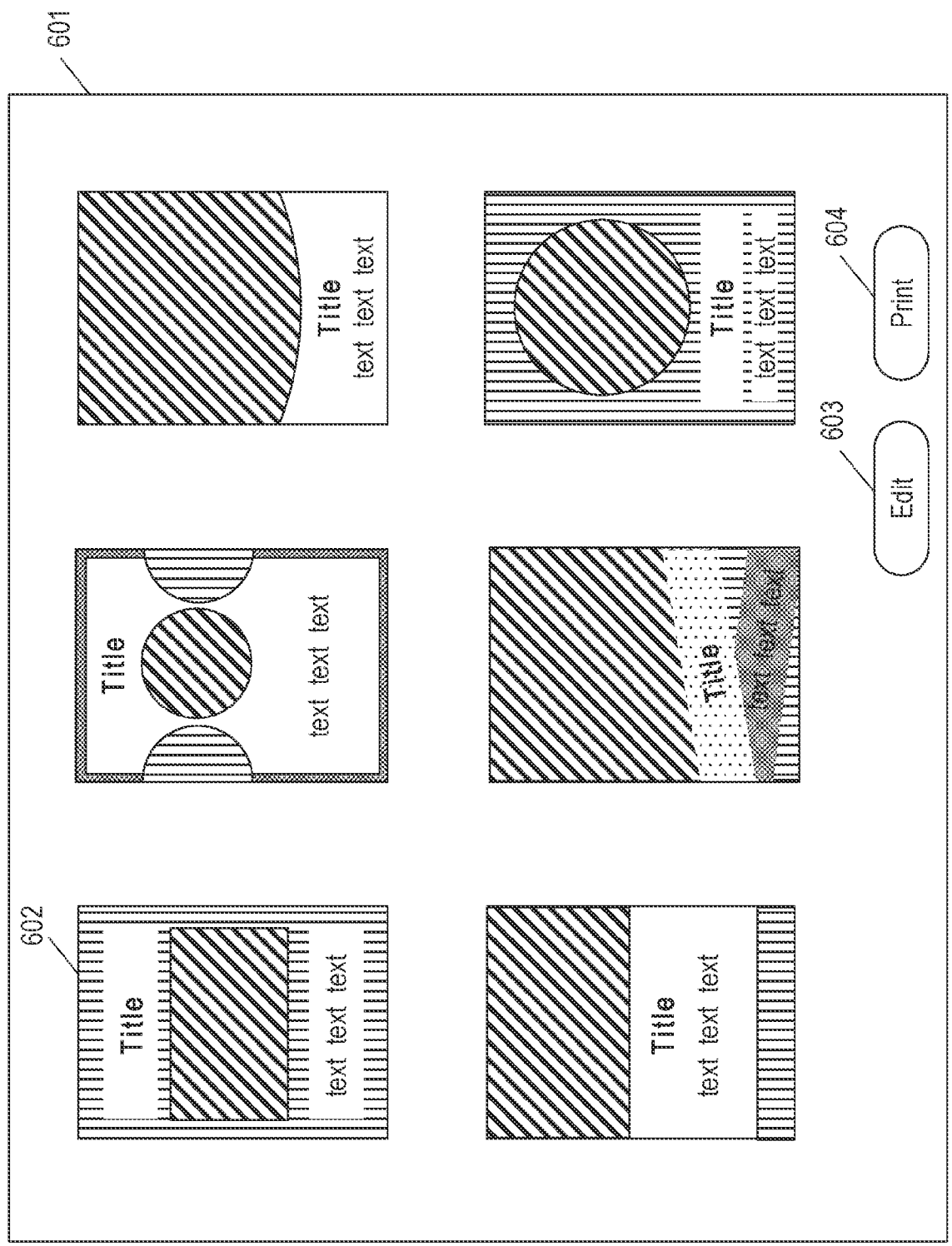
FIG. 6 is a diagram illustrating a display screen presented by the poster creation application.

FIG. 6 is a diagram illustrating an example of a poster preview screen for displaying poster images having been created by the poster display unit 205 on the display 105. Upon completion of poster creation after the clicking of the OK button 517 on the app screen 501, the screen displayed on the display 105 switches to a poster preview screen 601.

Poster images 602 illustrated therein are the poster images outputted by the poster display unit 205. Since the poster creation unit 210 creates a plurality of posters whose number corresponds to the number designated by the poster creation condition designating unit 201, the poster images 602 are also displayed in a layout like an album of the created posters. By operating the pointing device 107 to click a poster, the user is able to put this poster into a selected state.

Clicking an edit button 603 enables the user to edit the selected poster by using a UI that provides an edit function that is not illustrated therein.

Clicking a print button 604 enables the user to obtain a print output of the selected poster by using a control UI of a printer that is not illustrated therein.

Poster Impression Quantification

A method for quantifying poster impression, which is necessary for poster creation processing that will be described later, will now be described. In poster impression quantification, impression that a human gets from various posters is quantified.

At the same time, a corresponding relationship between a poster image and a poster impression is derived. Deriving this relationship makes it possible to estimate a poster impression from a poster image to be created. Once the impression is estimated, it becomes possible to control the impression of the poster by performing poster retouching or possible to search for a poster that will give a certain aimed impression. Processing for quantifying the impression of a poster is executed by, for example, in an information processing apparatus, running an impression learning application for learning the impression of a poster in advance, prior to executing poster creation processing.

Figure 7:
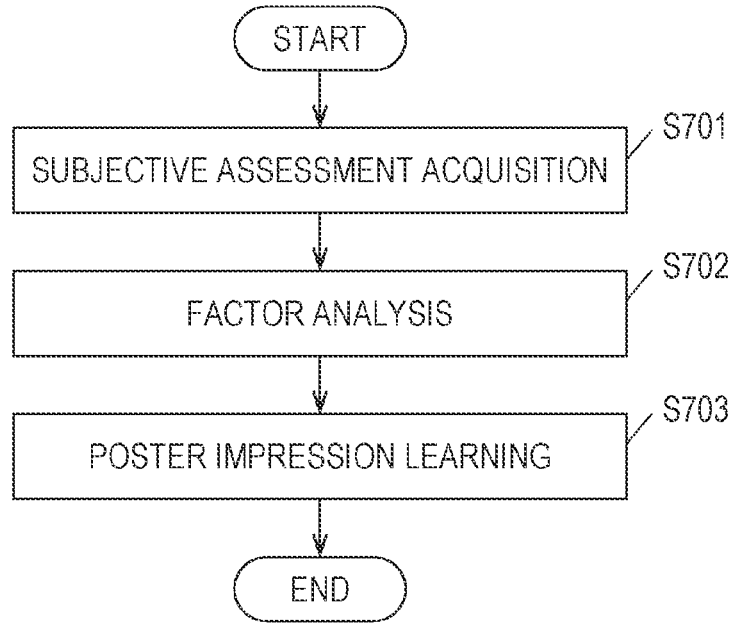
FIG. 7 is a flowchart illustrating processing for quantifying the impression of a poster.

FIG. 7 is a flowchart illustrating processing for quantifying the impression of a poster. The flowchart illustrated in FIG. 7 is implemented by, for example, reading a program stored in the HDD 104 out into the RAM 103 and running the program by the CPU 101. With reference to FIG. 7, processing for quantifying the impression of a poster will now be described. The reference alphabet "S" in the description of each processing below denotes a step in the flowchart (the same applies hereinafter in this specification).

Figure 8:
FIG. 8 is a diagram illustrating an example of subjective assessment of a poster.

In S701, a subjective assessment acquisition unit performs subjective assessment of an impression of a poster. FIG. 8 is a diagram for explaining a method for subjective assessment of an impression of a poster. The subjective assessment acquisition unit presents a poster to a person who is an assessment participant, and acquires, from the person, subjective assessment of an impression that s/he gets from the poster. In this process, a measurement method known as a sematic differential (SD) method or a Likert scale method can be used. FIG. 8 illustrates an example of a questionnaire using the SD method. Pairs of adjectives that express impression are presented to a plurality of persons who performs assessment, and scoring is performed as to how the poster that is under the questionnaire looks regarding the pairs of adjectives. The subjective assessment acquisition unit acquires the results of subjective assessment from a plurality of persons who are assessment participants for a plurality of posters and thereafter calculates an average value of answers for each pair of adjectives, thereby obtaining a representative numerical value for the pair of adjectives. An alternative method other than the SD method may be used for subjective assessment of the impression. It is sufficient as long as words describing impression and scores for the words can be determined.

In S702, a factor analysis unit performs a factor analysis of the results of subjective assessment acquired by the subjective assessment acquisition unit. If the results of subjective assessment are handled as they are, the number of pairs of adjectives will be the number of dimensions, resulting in complex control. Therefore, it is desirable to reduce this number to an efficient number of dimensions by using an analysis technique such as a principal component analysis or a factor analysis. In the present embodiment, it is assumed that a dimensional reduction to four factors is performed using a factor analysis. As a matter of course, this number varies depending on pairs of adjectives selected for subjective assessment and the method of a factor analysis. It is further assumed that the output of the factor analysis has been standardized. That is, each factor is scaled to have an average of 0 and a variance of 1 in the poster used for the analysis. This makes it possible to obtain correspondences between $-2, -1, 0, +1$, and $+2$ of the impression designated by the aimed impression designating unit 204 and $-2\sigma, -1\sigma$, the average, $+1\sigma$, and $+2\sigma$ in each impression as it is, thereby making it easier to calculate a distance between an aimed impression and an estimated impression, which will be described later. In the present embodiment, a sense of luxury, a sense of affinity, a sense of dynamism, and a sense of massiveness that are illustrated in FIG. 5 are taken as the four factors. However, they are names given for the convenience of conveying impression to the user via a user interface, and each factor is constructed such that plural pairs of adjectives have influences on one another.

In S703, an impression learning unit associates a poster image with an impression. Though it is possible to quantify the impression of the poster for which subjective assessment has been performed using the method described above, there is a need to estimate an impression without subjective assessment also for a poster that is to be created from now. The association between a poster image and an impression can be realized by learning a model for estimating an impression from a poster image by using, for example, a deep learning method based on a convolution neural network (CNN), a machine learning method employing a decision tree, or the like. In the present embodiment, the impression learning unit performs supervised deep learning using CNN while taking a poster image as its input and outputting the four factors. That is, a deep learning model is created by learning the poster images having been subjected to the subjective assessment and the corresponding impression as correct answers, and then an impression is estimated by inputting an unknown poster image into the learned model.

The deep learning model created as described above is stored into, for example, the HDD 104, and the impression estimation unit 218 loads the deep learning model stored in the HDD 104 into the RAM 103 and executes it.

The impression estimation unit 218 puts the poster data acquired from the layout unit 217 into the form of an image, and causes the CPU 101 or the GPU 109 to run the deep learning model having been loaded into the RAM 103, thereby estimating the impression of the poster. Though a deep learning method is used in the present embodiment, this is a non-limiting example. For example, in a case where a machine learning method such as a decision tree is used, a feature amount such as an average luminance value or an edge amount of a poster image may be extracted by performing image analysis, and a machine learning model for estimating an impression may be created based on the feature amount.

Flow of Processing

FIG. 9 is a flowchart illustrating poster creation processing performed by the poster creation application. The flowchart illustrated in FIG. 9 is implemented by, for example, reading a program stored in the HDD 104 out into the RAM 103 and running the program by the CPU 101. In the description of FIG. 9, it is assumed that the components illustrated in FIG. 2, as which the CPU 101 functions by running the poster creation application described above, perform processing. With reference to FIG. 9, poster creation processing will now be described. The reference alphabet "S" in the description of each processing below denotes a step in the flowchart (the same applies hereinafter in this specification).

In S901, the poster creation application displays the app screen 501 on the display 105. The user inputs various settings via the UI screen of the app screen 501 by operating the keyboard 106 and the pointing device 107.

In S902, the poster creation condition designating unit 201, the text designating unit 203, the image designating unit 202, and the aimed impression designating unit 204 acquires the settings from the app screen 501.

In S904, the image acquisition unit 211 acquires image data. Specifically, the image acquisition unit 211 reads the image files designated by the image designating unit 202 out of the HDD 104 into the RAM 103.

In S903, the skeleton selection unit 214, the color arrangement pattern selection unit 215, and the font selection unit 216 determine the number of skeletons, the number of color arrangement patterns, and the number of fonts that are selected, respectively, depending on "the number of those to be created" designated by the poster creation condition designating unit 201. In the present embodiment, the layout unit 217 creates pieces of poster data the number of which corresponds to the number of skeletons multiplied by the number of color arrangement patterns further multiplied by the number of fonts by using a method that will be described later. When this is performed, the number of skeletons, the number of color arrangement patterns, and the number of fonts that are selected is determined in such a manner that the number of pieces of poster data that are created exceeds the number of those to be created. In the present embodiment, each of the number of skeletons, the number of color arrangement patterns, and the number of fonts is determined in accordance with the formula 1 shown below.

$$\text{Number of those selected} = \lceil \sqrt[3]{\text{Number of those to be created} \times 2} \rceil \quad (1)$$

For example, if the number of those to be created is six, the number of those selected is three, and, in this case, the number of pieces of poster data created by the layout unit 217 is 27, from among which a poster selection unit 219 selects six pieces of poster data.

By this means, the poster selection unit 219 is able to perform poster selection such that the impression of a poster as a whole matches with the aimed impression from among the created pieces of poster data the number of which is not less than the number of those to be created.

In S905, the image analysis unit 212 performs analysis processing on the image data having been acquired through the processing in the step S904 to acquire a feature amount. The feature amount is, for example, meta-information contained in an image, and an image feature amount that can be acquired by conducting an image analysis. In the present embodiment, object recognition is performed as the analysis processing. However, the scope of the present disclosure is not limited to this example. Any other analysis processing may be performed. The processing performed at the image analysis unit 212 will now be described in detail.

The image analysis unit 212 performs object recognition on the image having been acquired through the processing in the step S904.

A known method can be used for performing the object recognition. In the present embodiment, an object is recognized by a determiner generated by Deep Learning.

The determiner outputs, in 0 to 1, a likelihood as to whether a certain pixel that is a constituent of an image is a constituent pixel of each object or not, and recognizes that an object exceeding a certain threshold exists in the image. The image analysis unit 212 is capable of acquiring the type and position of an object such as a face, a pet such as a dog or a cat, a flower, food, a building, an ornament, and a landmark.

In S906, the skeleton acquisition unit 213 acquires skeletons matching with various set conditions. In the present embodiment, it is assumed that each one skeleton is described in one file and is stored in the HDD 104. The skeleton acquisition unit 213 reads skeleton files one after another out of the HDD 104 into the RAM 103, retains skeletons that meet the set conditions on the RAM 103, and deletes skeletons that do not meet the set conditions from the RAM 103. For the skeleton having been read into the RAM 103, first, the skeleton acquisition unit 213 determines whether the poster size designated by the poster creation condition designating unit 201 agrees with the skeleton size or not. Though matching in size is checked in this example, matching in aspect ratio only may be checked.

In this case, the skeleton acquisition unit 213 enlarges or reduces the coordinate system of the read skeleton, and acquires skeletons the enlarged or reduced size of which agrees with the poster size designated by the poster creation condition designating unit 201. Next, the skeleton acquisition unit 213 determines whether the category of the skeleton agrees with the use category designated by the poster creation condition designating unit 201 or not. For a skeleton that is to be used for a specific use only, its use category is described in its skeleton file so that this skeleton will not be acquired except for a case where this use category is selected. In a case where a skeleton is designed as specific-purpose one, with a particular use in mind, for example, when the skeleton contains a graphic of sports articles that will make the person who sees the poster think of a school, this makes it possible to prevent such a specific-purpose skeleton from being used for a wrong category. Next, the skeleton acquisition unit 213 determines whether the number of image objects in the read skeleton agrees with the number of images acquired by the image acquisition unit 211 or not. Finally, the skeleton acquisition unit 213 determines whether the text object in the read skeleton agrees with the character information designated by the text designating unit 203 or not. More specifically, it is determined whether the types of the character information designated by the text designating unit 203 are included in the skeleton or not. For example, suppose that character strings are designated in the title box 502 and the text body box 504 on the app screen 501, and a blank is designated in the sub-title box 503. In this case, a search is executed on all text objects included in the skeleton, and the skeleton is determined as matching one if both a text object for which "title" is set and a text object for which "text body" is set as the types of character information of metadata are found, and the skeleton is determined as non-matching one in other cases. As described above, the skeleton acquisition unit 213 retains, on the RAM 103, skeletons for which all of the skeleton size, the number of image objects, and the types of text objects are determined to match with the set conditions. In the present embodiment, the skeleton acquisition unit 213 performs the determination for all of the skeleton files stored in the HDD 104; however, this is a non-limiting example. For example, the poster creation application may pre-store a database that associates file paths of skeleton files with search conditions (the skeleton size, the number of image objects, and the types of text objects) in the HDD 104. In this case, the skeleton acquisition unit 213 is able to perform skeleton-file acquisition at a high speed by reading not all but only matching skeleton files found as a result of executing a search through the database out of the HDD 104 into the RAM 103.

Figures 10A, 10B, 10C:
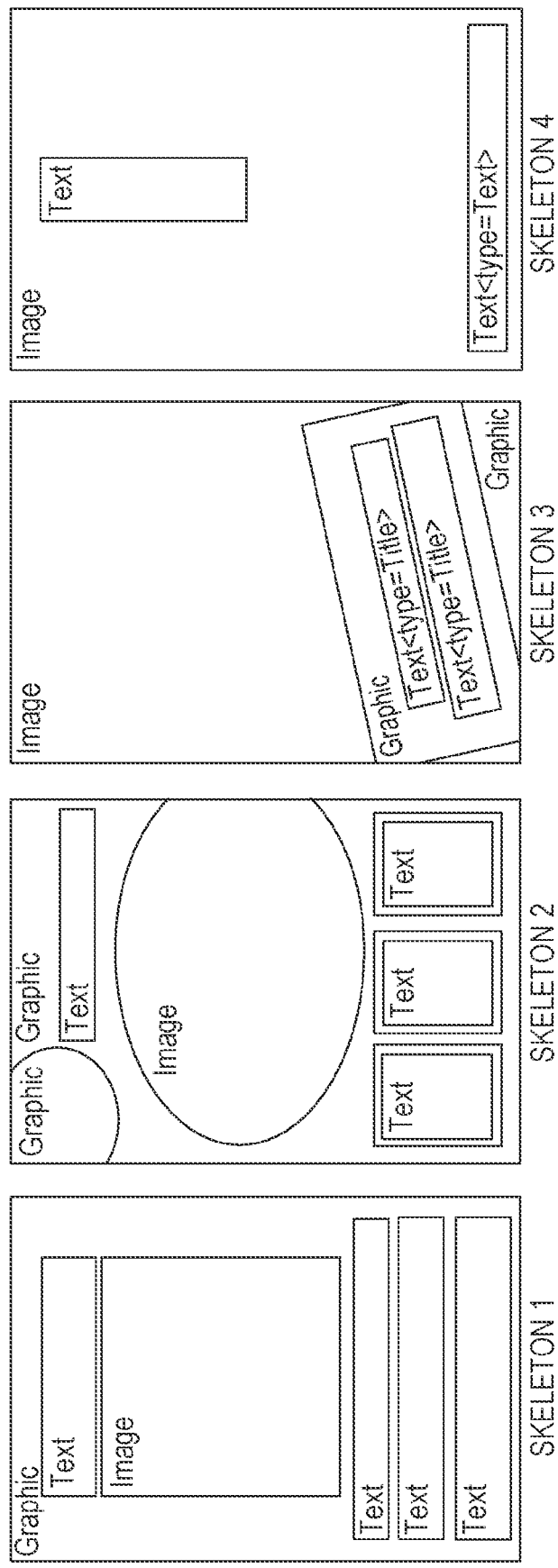
FIG. 10A is a diagram for explaining a method for skeleton selection.
FIG. 10B is a diagram for explaining a method for skeleton selection.
FIG. 10C is a diagram for explaining a method for skeleton selection.

In S907, the skeleton selection unit 214 selects skeletons matching with the aimed impression designated by the aimed impression designating unit 204 from among the skeletons having been acquired through the processing in the step S906. FIGS. 10A, 10B, and 10C are diagrams for explaining a method for skeleton selection by the skeleton selection unit 214. FIG. 10A is a diagram illustrating an example of a table for associating skeletons with impression. The skeleton-name column in FIG. 10A shows the file names of skeletons, and the columns "a sense of luxury", "a sense of affinity", "a sense of dynamism", and "a sense of massiveness" show how much the skeleton contributes to each item of impression. First, the skeleton selection unit 214 calculates the distance between the aimed impression acquired from the aimed impression designating unit 204 and the values in the skeleton impression table illustrated in FIG. 10A. For example, if the aimed impression is "a sense of luxury +1, a sense of affinity −1, a sense of dynamism −2, and a sense of massiveness +2", the distance calculated by the skeleton selection unit 214 has values illustrated in FIG. 10B. In the present embodiment, a Euclidean distance is used as the distance. Next, the skeleton selection unit 214 selects top N skeletons in an ascending order of the values of the distance illustrated in FIG. 10B. In the present embodiment, the skeleton selection unit 214 selects top two skeletons. That is, Skeleton 1 and Skeleton 4 are selected.

A fixed value may be set as the value N. Alternatively, the value may be varied depending on the conditions designated by the poster creation condition designating unit 201. For example, if six, the number of those to be created, is designated in the number-of-those-created box 514 on the app screen 501, the poster creation unit 210 creates six posters. The layout unit 217 that will be described later generates posters by combining the skeletons selected by the skeleton selection unit 214, the color arrangement patterns selected by the color arrangement pattern selection unit 215, and the fonts selected by the font selection unit 216. For example, if two skeletons, two color arrangement patterns, and two fonts are selected, it is possible to create eight posters, meaning 2×2×2=8; therefore, it is possible to satisfy the condition of the number of those to be created, namely, six. As described here, the number of skeletons selected may be determined depending on the conditions designated by the poster creation condition designating unit 201.

The range of values of each item of impression in the skeleton impression table illustrated in FIG. 10A does not have to be the same as the range of values of impression designated by the aimed impression designating unit 204. In the present embodiment, the range of values of impression designated by the aimed impression designating unit 204 is from −2 to +2, and the range of values of impression in the skeleton impression table may be different from this range.

In that case, the distance calculation described above is performed after performing scaling to bring the range of values in the skeleton impression table into concordance with the range of values of the aimed impression. The distance calculated by the skeleton selection unit 214 is not limited to a Euclidean distance. It is sufficient as long as an inter-vector distance such as a Manhattan distance or cosine similarity can be calculated. If the radio button 512 is set OFF, the corresponding item of aimed impression is excluded from the distance calculation.

It is possible to generate the skeleton impression table by, for example, creating a poster on the basis of each skeleton, with the color arrangement pattern fixed, with the font fixed, and with the image and character information to be arranged on the skeleton fixed, and then by estimating the impression thereof. That is, relative characteristics in relation to other skeletons are rendered into the form of a table by estimating the impression of each of posters that are identical to one another in terms of colors, images, etc. that are used but are different from one another in terms of layout. When this is performed, processing for cancelling impression attributable to color arrangement patterns and images that are used should preferably be performed; for example, standardization based on the estimated impression as a whole, or averaging of the impression of a plurality of posters created using a plurality of color arrangement patterns and images from a single skeleton, or the like, should preferably be performed. By this means, it is possible to express the effects of layout in the form of a table, such as, for example, for a skeleton whose image areas are small, graphics and characters, not images, are dominant factors of impression, inclined arrangement of an image and characters enhances a sense of dynamism, and the like. FIG. 10C illustrates a layout example corresponding to Skeletons 1 to 4 illustrated in FIG. 10A. For example, in Skeleton 1, an image object and text objects are arranged in a regular manner, and the area size of an image is small; therefore, this skeleton gives a low level of a sense of dynamism. In Skeleton 2, a graphic object and an image object have a round shape; this skeleton gives a high level of a sense of affinity and a low level of a sense of massiveness. In Skeleton 3, the layout size of an image object is large, and, in addition, an inclined graphic object is superposed on the image object; therefore, this skeleton gives a high level of a sense of dynamism. In Skeleton 4, an image is placed on the entire skeleton area, with the minimum text object; therefore, this skeleton gives a high level of a sense of massiveness and a low level of a sense of dynamism. As described here, an impression varies depending on the layout of images, graphics, and characters. A method for creating the skeleton impression table is not limited to the above example; an estimation may be made based on the features of layout information themselves such as the area size and coordinates of an image and a title character string, or a manual adjustment may be made. The skeleton impression table is stored in the HDD 104. The skeleton selection unit 214 reads the skeleton impression table out of the HDD 104 into the RAM 103 and looks it up.

In S908, the color arrangement pattern selection unit 215 selects a color arrangement pattern(s) matching with the aimed impression designated by the aimed impression designating unit 204. The color arrangement pattern selection unit 215 looks up an impression table corresponding to color arrangement patterns similarly as done in the step S906, and selects a color arrangement pattern(s) in accordance with the aimed impression. FIG. 11A illustrates an example of a color arrangement pattern impression table associating color arrangement patterns with impression. The color arrangement pattern selection unit 215 calculates the distance between columns "a sense of luxury" to "a sense of massiveness" in FIG. 11A and the aimed impression, and selects top N color arrangement patterns in an ascending order of the values of the calculated distance. In the present embodiment, top two color arrangement patterns are selected. The color arrangement pattern impression table is generated by, similarly to the generation of the skeleton impression table, creating posters while changing the color arrangement patterns from one to another, with factors other than the color arrangement pattern fixed, namely, with the skeleton fixed, with the font fixed, and with the image fixed, and then by estimating the impression thereof, thereby rendering the tendency of impression of the color arrangement pattern into the form of a table.

In S909, the font selection unit 216 selects fonts matching with the aimed impression designated by the aimed impression designating unit 204. The font selection unit 216 looks up an impression table corresponding to fonts similarly as done in the step S906, and selects a font(s) in accordance with the aimed impression. FIG. 11B illustrates an example of a font impression table associating fonts with impression. The font impression table is generated by, similarly to the generation of the skeleton impression table, creating posters while changing the fonts from one to another, with factors other than the font fixed, namely, with the skeleton fixed, with the color arrangement pattern fixed, and with the image fixed, and then by estimating the impression thereof, thereby rendering the tendency of impression of the font into the form of a table.

In S910, the layout unit 217 sets character information, an image, a color arrangement, and fonts for the skeleton selected by the skeleton selection unit 214, and creates a poster.

Figure 12:
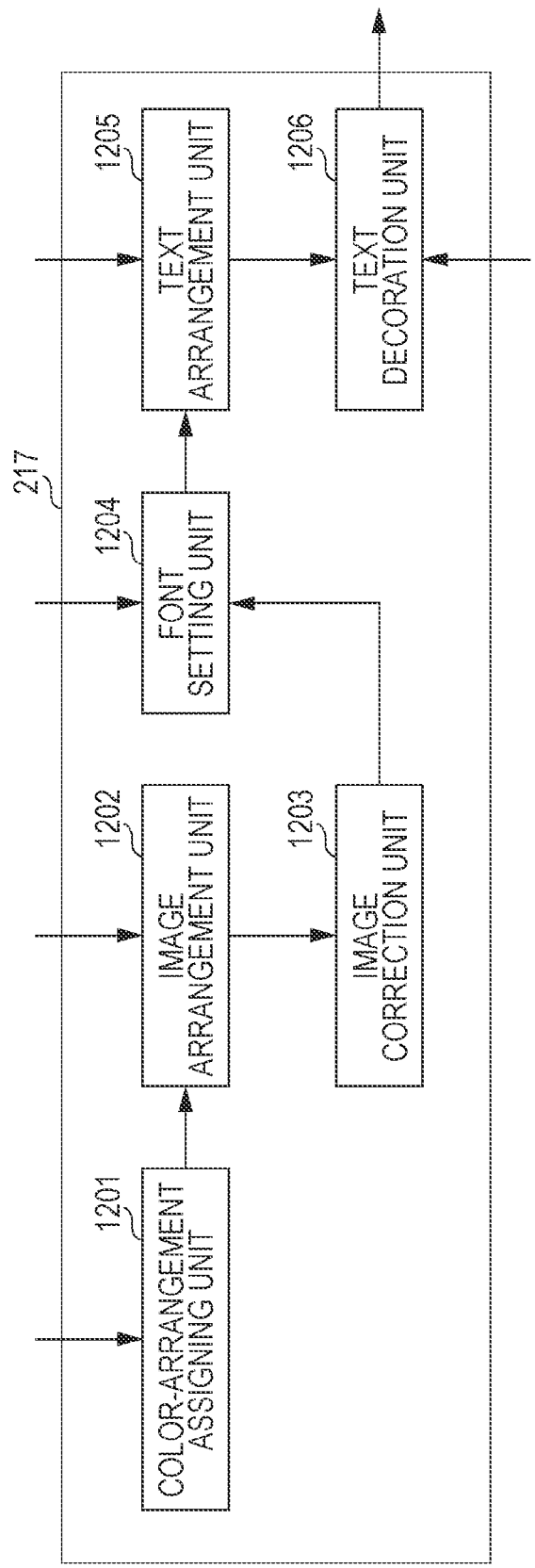
FIG. 12 is a software block diagram for explaining a layout unit in detail.
Figure 13:
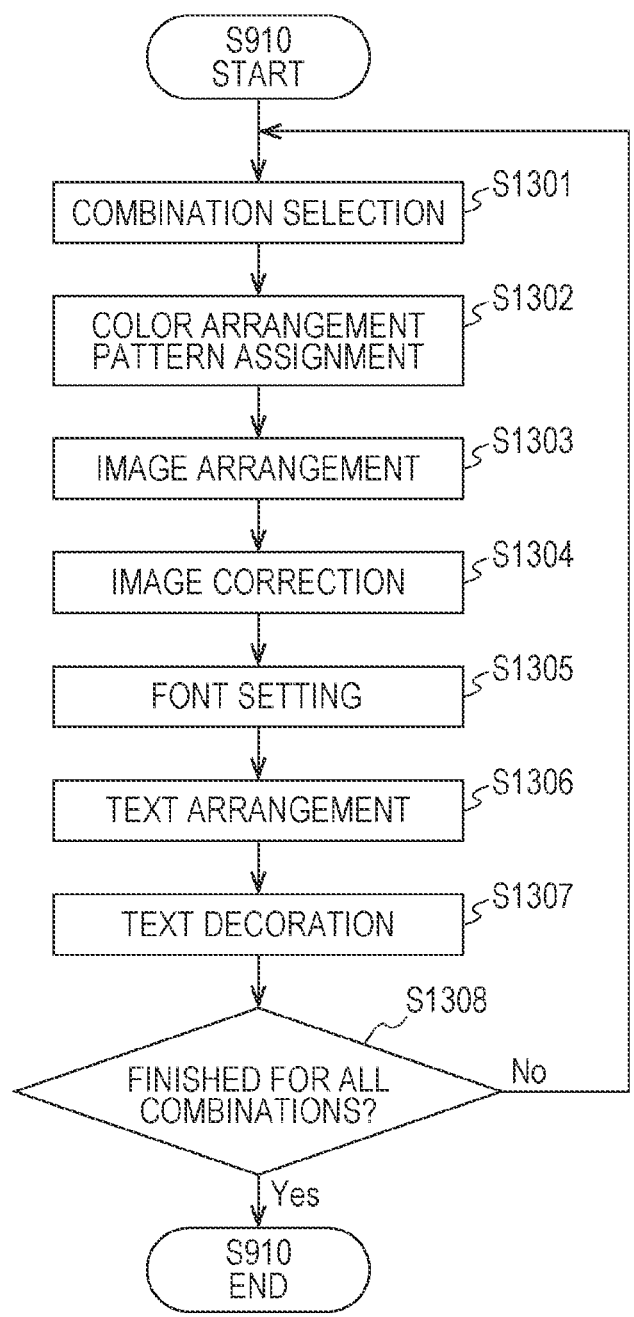
FIG. 13 is a flowchart illustrating layout processing.

With reference to FIGS. 12, 13, 14, and 15, S910 and the layout unit 217 will now be described in detail. FIG. 12 is an example of a software block diagram for explaining the layout unit 217 in detail. FIG. 13 is a flowchart for explaining S910 in detail. FIGS. 14A, 14B, and 14C are diagrams for explaining information that is inputted into the layout unit 217. FIG. 14A is a table of the character information designated by the text designating unit 203 and the image designated by the image designating unit 202. FIG. 14B illustrates an example of the color arrangement patterns acquired from the color arrangement pattern selection unit 215. FIG. 14C illustrates an example of the fonts acquired from the font selection unit 216. FIG. 15 is a diagram for explaining the process of processing performed by the layout unit 217.

In S1301, the layout unit 217 lists every combination of the skeletons acquired from the skeleton selection unit 214, the color arrangement patterns acquired from the color arrangement pattern selection unit 215, and the fonts acquired from the font selection unit 216. Then, the layout unit 217 creates poster data by performing layout processing described below for each of these combinations sequentially. For example, if the number of the skeletons acquired from the skeleton selection unit 214 is three and the number of the color arrangement patterns acquired from the color arrangement pattern selection unit 215 is two and the number of the fonts acquired from the font selection unit 216 is two, the layout unit 217 creates twelve pieces of poster data, meaning 3×2×2=12.

In S1302, a color-arrangement assigning unit 1201 assigns each color arrangement pattern acquired from the color arrangement pattern selection unit 215 to each skeleton acquired from the skeleton selection unit 214. FIG. 15A illustrates an example of a skeleton. In the present embodiment, an example of assigning a color arrangement pattern having a color arrangement ID1 illustrated in FIG. 14B to a skeleton 1501 illustrated in FIG. 15A will now be described. The skeleton 1501 illustrated in FIG. 15A is made up of two graphic objects 1502 and 1503, one image object 1504, and thee text objects 1505, 1506, and 1507. First, the color-arrangement assigning unit 1201 performs color arrangement on the graphic objects 1502 and 1503. Specifically, based on the color arrangement numbers that are metadata described in the graphic objects, corresponding colors are assigned thereto from the color arrangement pattern. Next, the last color in the color arrangement pattern is assigned to the text object whose type of metadata is "title" among the text objects. That is, in the present embodiment, Color 4 is assigned to the text object 1505. Next, for the text objects whose type of metadata is not "title" among the text objects, a character color is set based on the lightness of the background of these non-title text objects. In the present embodiment, the value of L* obtained when converting inputted data into L*a*b* by using a L*a*b* color space, which is a typical color space, is used as the lightness. The method for calculating the lightness is not limited thereto. For example, the value of L may be used as the lightness by using a known Hunter Lab conversion formula, or the value of V may be used as the lightness by using a known HSV conversion formula. Any method may be used as long as it is possible to calculate a value regarding a degree of lightness.

In the present embodiment, the character color is set to be white if the lightness of the background of these non-title text objects is not greater than a threshold, and, if greater than the threshold, black. FIG. 15B illustrates a state of a skeleton 1508 after the color assignment processing described above. The color-arrangement assigning unit 1201 outputs the color-arrangement-assignment-done skeleton data to an image arrangement unit 1202.

In S1303, the image arrangement unit 1202 arranges the image data acquired from the image analysis unit 212 on the skeleton data acquired from the color-arrangement assigning unit 1201, based on analysis information appended thereto. In the present embodiment, the image arrangement unit 1202 places image data 1401 at the image object 1504 included in the skeleton. In a case where the aspect ratio of the image object 1504 is different from the aspect ratio of the image data 1401, the image arrangement unit 1202 performs trimming so as to make the aspect ratio of the image data 1401 equal to the aspect ratio of the image object 1504. More specifically, the image arrangement unit 1202 performs trimming such that a face area and an object area that decrease due to the trimming are minimized, based on a face position and an object position that are obtained by analyzing the image data 1401. The trimming method is not limited to this example. Any other trimming method, for example, trimming the center of the image, performing composition-conscious trimming so that a face position will fit in a triangle composition, or the like, may be used. The image arrangement unit 1202 outputs the image-arrangement-done skeleton data to an image correction unit 1203.

In S1304, the image correction unit 1203 acquires the image-arrangement-done skeleton data from the image arrangement unit 1202 and performs correction on the image having been placed on the skeleton. In the present embodiment, up-sampling processing based on super-resolution processing is performed when the resolution of the image is insufficient. First, the image correction unit 1203 checks whether the image having been placed on the skeleton satisfies a predetermined level of resolution or not. For example, suppose that an image of 1,600 px×1,200 px has been placed at an area of 200 mm×150 mm on the skeleton. In this case, the print resolution of the image can be calculated using the following formula 2.

$$\frac{1600}{200 \div 25.4} \approx 203 [dpi] \qquad (2)$$

Next, the image correction unit 1203 performs super-resolution processing to make up for the insufficiency in resolution if the print resolution of the image is less than a threshold, or does not perform any image correction if the resolution is sufficient. In the present embodiment, the super-resolution processing is performed if the resolution is less than 300 dpi.

Figures 14A, 14B, 14C:
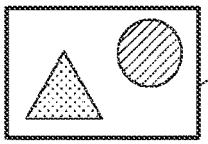
FIG. 14A is a diagram for explaining an input of a layout unit.
FIG. 14B is a diagram for explaining an input of the layout unit.
FIG. 14C is a diagram for explaining an input of the layout unit.

In S1305, a font setting unit 1204 sets the fonts acquired from the font selection unit 216 on the image-correction-done skeleton data acquired from the image correction unit 1203. FIG. 14C illustrates an example of the fonts selected by the font selection unit 216. In the present embodiment, font setting is performed for the text objects 1505, 1506, and 1507 of the skeleton 1508. In many instances a conspicuous font is chosen for the title of a poster to make it eye-catching, and an easier-to-read font for the other part of the text. Therefore, in the present embodiment, the font selection unit 216 selects two types of font, specifically, a title font and a text-body font. The font setting unit 1204 sets the title font for the text object 1505, which corresponds to the title, and the text-body font for the rest, the text objects 1506 and 1507. The font setting unit 1204 outputs the font-setting-done skeleton data to a text arrangement unit 1205. Though the font selection unit 216 selects two types of font in the present embodiment, the scope of the present disclosure is not limited thereto. For example, a title font only may be selected. In that case, the font setting unit 1204 uses a font that goes well with the title font as the text-body font. That is, setting a text-body font that matches with the type of the title font suffices; for example, a typical Gothic font that is easy to read is selected for the other part of the text if the font of the title is a Gothic font, or a typical Mincho font is selected for the other part of the text if the font of the title is a Mincho font. Of course, the text-body font may be the same as the title font. Plural fonts may be used selectively depending on how much the user wants the text to draw the attention of the person who sees the poster; for example, the title font is used for the text objects corresponding to the title and the sub-title, or the title font is used for a predetermined font size or larger.

In S1306, the text arrangement unit 1205 arranges the texts designated by the text designating unit 203 on the font-setting-done skeleton data acquired from the font setting unit 1204. In the present embodiment, each text illustrated in FIG. 14A is assigned thereto while referring to the metadata of the text objects of the skeleton. That is, the title "Great Appreciation Summer Sale" is assigned to the text object 1505, and the sub-title "Beat the mid-summer heat!" is assigned to the text object 1506. Nothing is assigned to the text object 1507 because no text has been set for it. FIG. 15C illustrates a skeleton 1509, which is an example of skeleton data after the processing performed by the text arrangement unit 1205. The text arrangement unit 1205 outputs the text-arrangement-done skeleton data to a text decoration unit 1206.

In S1307, the text decoration unit 1206 evaluates the character readability of the text objects included in the text-arrangement-done skeleton data acquired from the text arrangement unit 1205, and, based on the aimed impression acquired from the aimed impression designating unit 204, adds decoration thereto.

Figure 17:
FIG. 17 is a diagram for explaining character decoration.

With reference to FIG. 17, character decoration will now be described. In comparison with characters 1701 without decoration, characters 1702 with decoration by contouring and characters 1703 with decoration by adding luster offer enhanced readability. However, an impression that a user receives from the characters 1702 with decoration by contouring is different from an impression that the user receives from the characters 1703 with decoration by adding luster. Therefore, processing for appropriately creating a poster that expresses an impression intended by a user, even in a case where character decoration is performed, will be described in the present embodiment.

Figure 18:
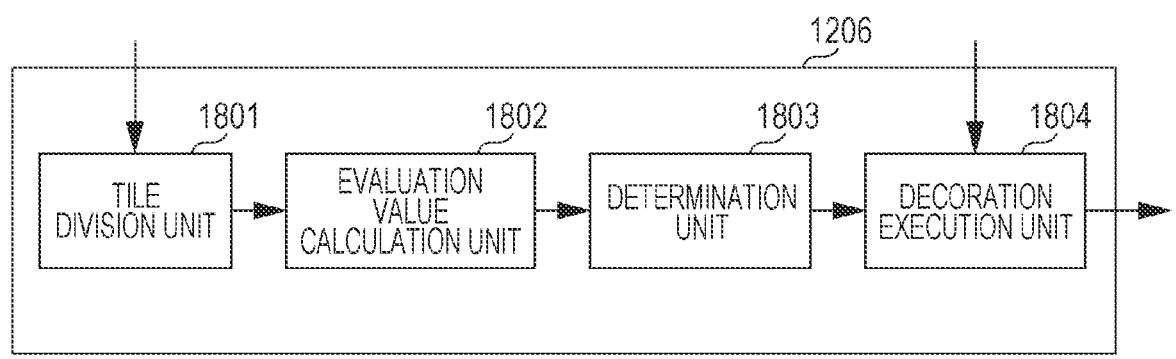
FIG. 18 is a software block diagram for explaining a text decoration unit in detail.
Figure 19:
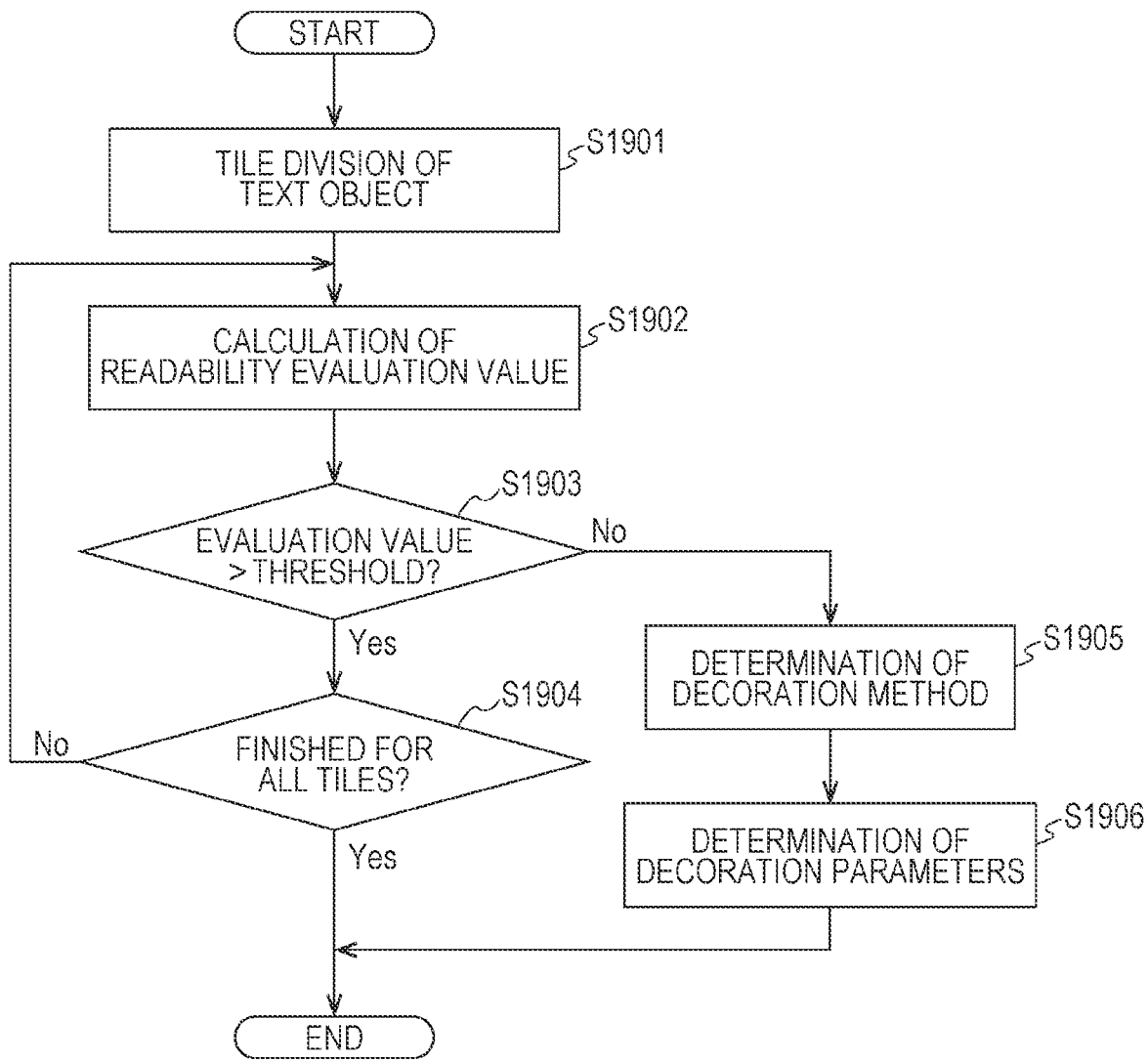
FIG. 19 is a flowchart illustrating text decoration processing.

With reference to FIGS. 18 and 19, processing performed by the text decoration unit 1206 will now be described in detail. FIG. 18 is an example of a software block diagram for explaining the text decoration unit 1206 in detail. The text decoration unit 1206 includes a tile division unit 1801, an evaluation value calculation unit 1802, a determination unit 1803, and a decoration execution unit 1804.

The tile division unit 1801 puts, into the form of an image, an area where the text object is arranged in the text-arrangement-done skeleton data acquired from the text arrangement unit 1205, and then executes tile division. The evaluation value calculation unit 1802 evaluates the readability of characters. The determination unit 1803 determines whether or not the readability of characters is not less than a threshold. The decoration execution unit 1804 determines a character decoration method and relevant parameters matching with the aimed impression designated by the aimed impression designating unit 204, and adds decoration to the characters.

FIG. 19 is a flowchart for explaining processing performed by the text decoration unit 1206 in detail.

Figure 3:
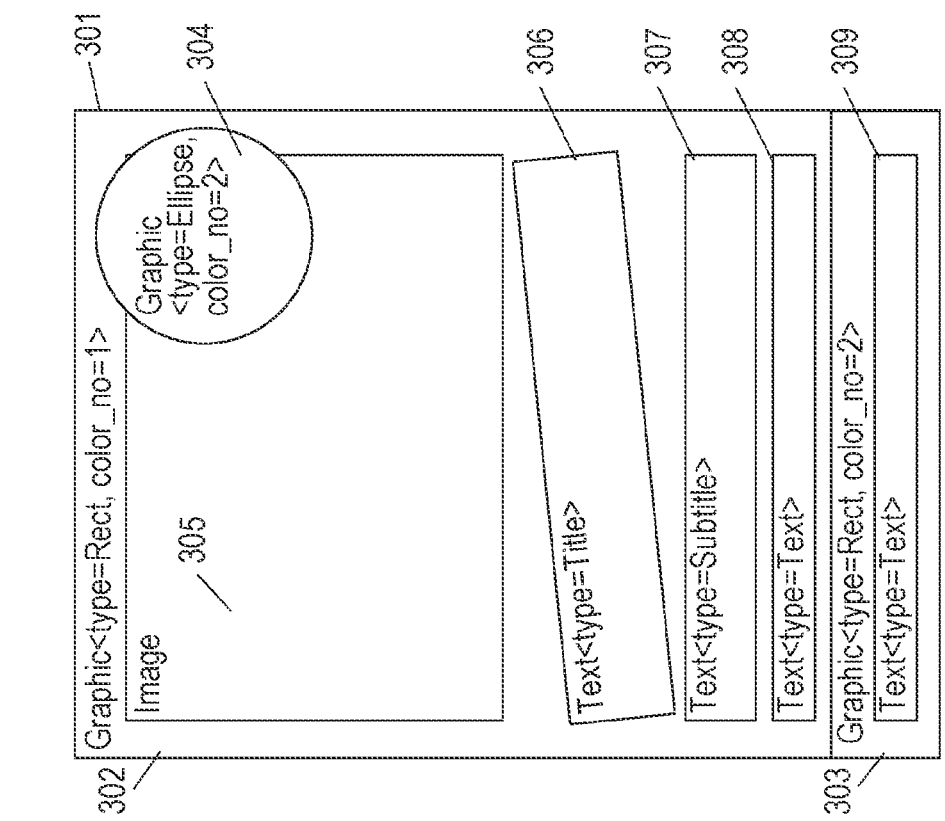
FIG. 3A is a diagram illustrating an example of a skeleton.
FIG. 3B is a diagram illustrating an example of metadata.

In S1901, for the text object whose type of metadata is "title" among the text objects, the tile division unit 1801 performs rendering of the area where the text object is arranged, inclusive of other objects arranged on the background. Then, the tile division unit 1801 performs tile division processing on the image obtained by performing the rendering. For example, in a case where the skeleton illustrated in FIG. 3 is used, the tile division unit 1801 performs rendering of the area indicated by the rectangle of the text object 306, inclusive of the background, and then performs the tile division processing.

Figure 20A:
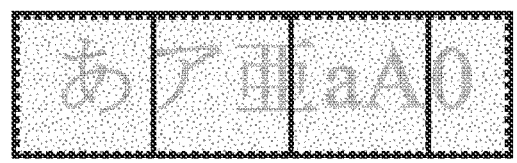
FIG. 20A is a diagram for explaining operation of a tile division unit.
Figure 20B:
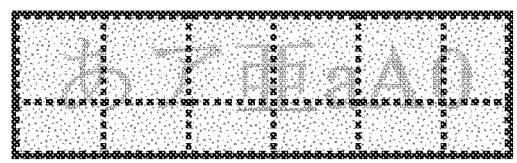
FIG. 20B is a diagram for explaining operation of the tile division unit.

FIGS. 20A and 20B are diagrams for explaining the tile division processing. In the present embodiment, as illustrated in FIG. 20A, the tile division processing is performed in the unit of a square whose each one side corresponds to the length of the shorter side of the text object area. Though the size of the tile corresponds to the length of the shorter side of the text object area in this example, the method for tile division is not limited thereto. For example, as illustrated in FIG. 20B, a square that has a certain fixed size may be adopted instead. In this case, a value for a certain poster size is pre-stored, and this value is converted based on the poster size designated by the poster creation condition designating unit 201, thereby obtaining the fixed size. For example, for calculating the fixed size, a value of 10 mm for an A4 size is pre-stored, and if the poster size designated by the poster creation condition designating unit 201 is an A2 size, performing the tile division processing in the unit of a square whose each one side has a length of 20 mm calculated therefrom suffices. Though the entire area of the text object is taken as the target of processing in the present embodiment, a rectangular area that is one-and-a-half times as large as the character size with respect to the center of each character that is actually inputted may be taken as the target of processing. These methods are non-limiting examples, and any other method may be used as long as it is possible to set an appropriate processing area in order to evaluate the readability. The processing from S1902 to S1904 described below is executed for each of the divided tiles.

Figure 21:
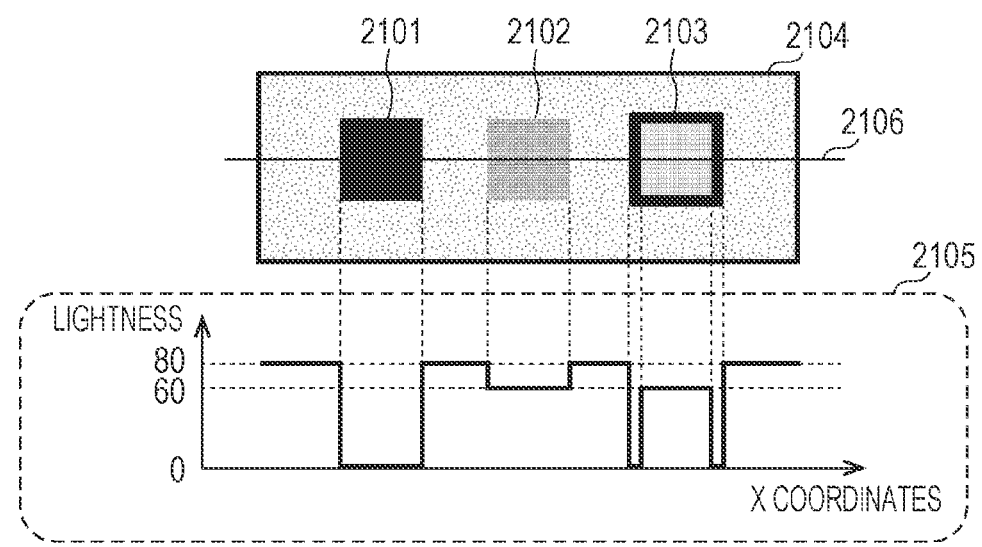
FIG. 21 is a diagram for explaining character readability.

In S1902, the evaluation value calculation unit 1802 evaluates the readability of characters. FIG. 21 is a diagram for explaining the readability of characters. In FIG. 21, in order to express the readability simply, quadrangles 2101 to 2103 are assumed to be characters. The quadrangles 2101 and 2102 represent characters without decoration. The quadrangle 2103 represents a character with decoration by contouring. A line profile 2105 shows the values of lightness of pixels on a line 2106 going across a character image 2104. The value of lightness of the quadrangle 2101 is zero. The value of lightness of each of the quadrangles 2102 and 2103 is 60. The value of lightness of the contour of the quadrangle 2103 is zero. The value of lightness of the background of the character image 2104 is 80. As can be seen from FIG. 21, the readability of the quadrangle 2102 is lower than that of the quadrangle 2101. The difference in lightness between the quadrangle 2101 and the background is 80, whereas the difference in lightness between the quadrangle 2102 and the background is 20. As described here, the less the difference in lightness between the character and the surrounding area around the character is, the harder the visual distinguishing of the character and the surrounding area around the character from each other is, resulting in lower readability. On the other hand, the readability of the quadrangle 2103 is high despite the fact that the difference in lightness between the character and the background is 20, which is the same as that of the quadrangle 2102. This is because the great difference in lightness between the contour of the quadrangle 2103 and the background, or between the contour of the quadrangle 2103 and the character, makes it easier to visually distinguish the character and the surrounding area around the character from each other. In the present embodiment, the above-described difference in lightness between the character and the surrounding area around the character will be referred to also as "readability evaluation value". Moreover, the difference in lightness between the character and the background will be referred to as "readability evaluation value for the character and the background", and the difference in lightness between the character and the decorated portion will be referred to as "readability evaluation value for the character and the decoration".

In the present embodiment, the readability evaluation value for the character and the background is calculated. In the present embodiment, based on the color of characters assigned to the text object, the lightness of the characters is calculated. In addition, in the present embodiment, the lightness of the average color of the background area excluding the characters is calculated as the lightness of the background. The method for calculating the lightness of the background is not limited to this example. For example, a three-dimensional color histogram of the background pixels may be calculated, the color whose number of pixels is largest may be extracted, and the lightness of this color may be calculated. Any method may be used as long as it is possible to calculate a value regarding a degree of lightness of the background area.

In S1903, the determination unit 1803 determines whether the readability evaluation value having been calculated in S1902 is greater than a threshold or not. The greater the threshold is, the severer the evaluation of the readability is. The threshold is set within the range of the values of lightness calculated in S1902. In the present embodiment, the threshold is set to be 30. In a case where the readability evaluation value is determined to be greater than the threshold, the process proceeds to S1904. In a case where the readability evaluation value is determined to be not greater than the threshold, the process proceeds to S1905.

In S1904, the determination unit 1803 determines whether the processing from S1902 to S1903 has finished for all of the tiles or not. If it is determined that the processing has finished for all of the tiles (S1904: YES), the text decoration unit 1206 determines that character decoration is unnecessary. If it is determined that the processing has not finished for all of the tiles yet, the processing from S1902 is performed for the next different tile by looping back the process.

In the processing flow explained above, decoration processing is executed if the readability evaluation value of at least one tile is not greater than the threshold. However, for example, the decoration processing may be executed when the readability evaluation values of tiles of a predetermined ratio or higher are not greater than the threshold (for example, when the readability evaluation values of tiles of 10% or higher are not greater than the threshold). The threshold may be variable depending on the size of the text block. The decoration processing may be executed when a maximum value or an average value of the readability evaluation values of all tiles is not greater than the threshold.

Figures 22A, 22B:
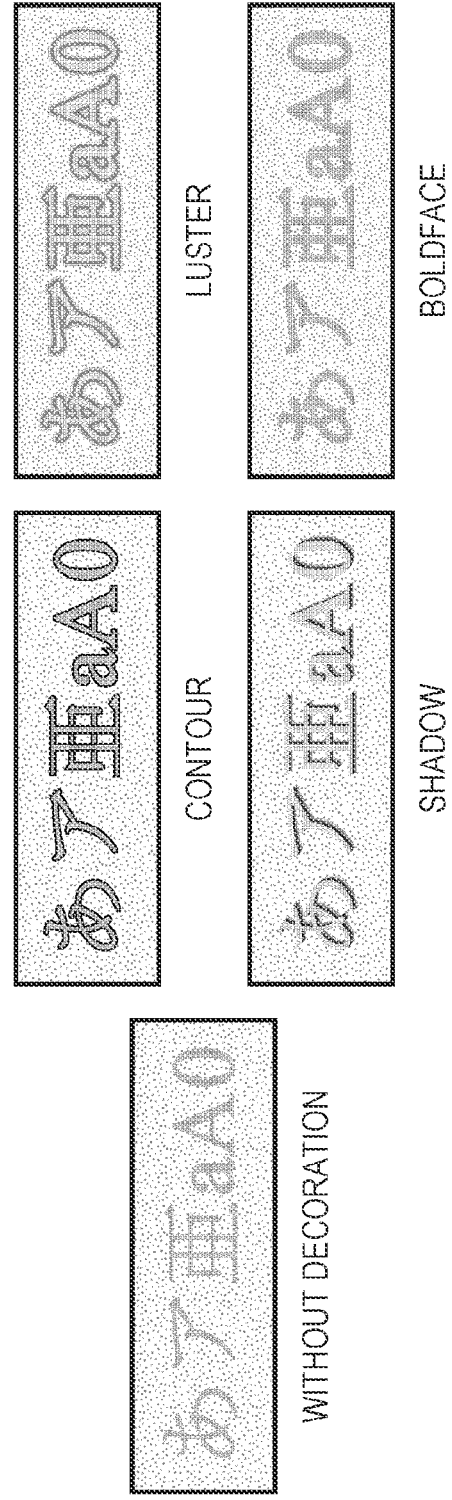
FIG. 22A is a diagram for explaining a method for selecting a character decoration method.
FIG. 22B is a diagram for explaining a method for selecting a character decoration method.

In S1905, for the text object for which it has been determined in S1903 that the readability evaluation value is not greater than the threshold, the decoration execution unit 1804 determines a character decoration method, based on the aimed impression designated by the aimed impression designating unit 204. FIGS. 22A and 22B are diagrams for explaining a method for selecting a decoration method by the text decoration unit 1206. FIG. 22A is a diagram illustrating an example of a table for associating character decoration methods with impression (hereinafter referred to as "character decoration impression table"). The column "Character decoration method" in FIG. 22A shows the types of character decoration method. In the present embodiment, contour, luster, shadow, and boldface are taken as examples of the decoration method. Another type of the decoration method, for example, chamfering, underline, or the like may be included in the table. Any character decoration method suffices as long as it is possible to enhance the readability of characters. The columns "a sense of luxury", "a sense of affinity", "a sense of dynamism", and "a sense of massiveness" in FIG. 22A show how much each type of character decoration method contributes to each item of impression. FIG. 22B illustrates an example of decorated characters to which the decoration method illustrated in FIG. 22A has been applied. As can be seen from the figure, the characters to which various types of decoration processing has been applied are easier to read than the characters without decoration. The text decoration unit 1206 looks up an impression table corresponding to the decoration method similarly as done in the step S906, and selects a character decoration method in accordance with the aimed impression. The character decoration impression table is generated by, similarly to the generation of the skeleton impression table, creating posters while changing the types of character decoration method from one to another, with factors other than the character decoration method fixed, namely, with the skeleton fixed, with the color arrangement pattern fixed, and with the font fixed, and then by estimating the impression thereof, thereby rendering the tendency of impression of the character decoration method into the form of a table.

Though the character decoration impression table is used in the present embodiment, the method for determining the character decoration method is not limited to this example. For example, fonts and types of character decoration method may have been associated in advance, and the character decoration method may be switched depending on the font of the text object to be processed. As for how to associate the fonts with the types of character decoration method, associating a character decoration method that gives an impression that is closest to an impression given by a font in terms of contribution, by using the character decoration impression table, and by using the font impression table used in S909, suffices. With this method, it is possible to determine a character decoration method without performing distance computation; therefore, it is possible to reduce a computation load.

In S1906, the decoration execution unit 1804 determines character decoration parameters related to the character decoration method having been determined in S1905. In the present embodiment, parameters regarding the color and width of decoration are determined.

Figure 23:
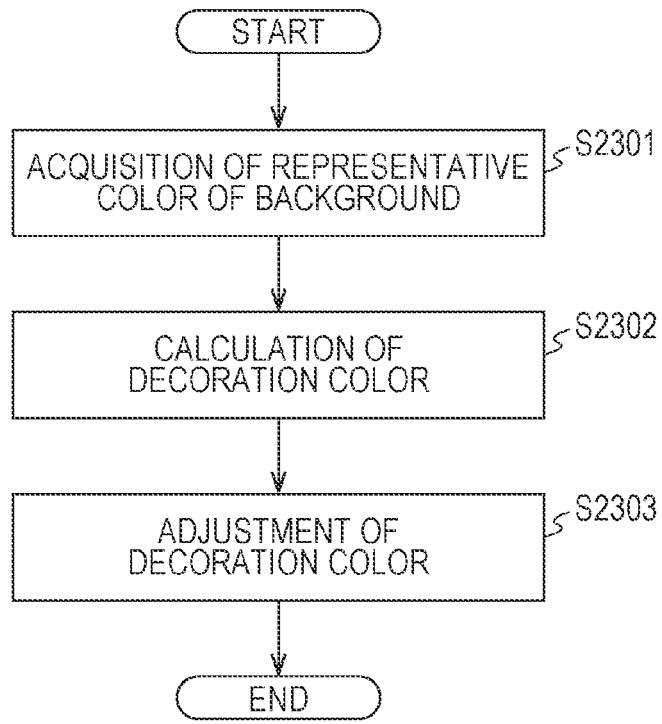
FIG. 23 is a flowchart illustrating character color determination processing.

For the character decoration method of "contour", "luster", and "shadow", the color of decoration is settable. With reference to FIG. 23, a method for determining the color of decoration will now be described in detail. FIG. 23 is a flowchart for explaining in detail a character color determination method in the determination of character parameters in S1906 of FIG. 19.

In S2301, the decoration execution unit 1804 acquires a representative color of the background of the text object. In the present embodiment, an average color of the background of the text object is taken as the representative color. The method for acquiring the representative color of the background is not limited thereto. For example, a three-dimensional color histogram of the background pixels may be calculated, and the color whose number of pixels is largest may be acquired as the representative color of the background.

In S2302, the decoration execution unit 1804 calculates a decoration color. In the present embodiment, as the decoration color, the same type of color that is obtained by changing the lightness of the representative background color having been acquired in S2301 is calculated. Using the same type of color for decoration makes the decoration result look natural; therefore, suppression in change in impression arising from the decoration can be expected. Specifically, after converting the representative color of the background into a Lab color space by using the conversion formula having been used in calculating the lightness in S1902, the lightness only of the representative color of the background is changed. In the present embodiment, a certain constant is added to or subtracted from the lightness of the representative color of the background by using the following formula 3, based on a relationship between the lightness of the representative color of the background and the lightness of the character color.

$$L'_{back} = \begin{cases} L_{back} + C & \text{if } L_{back} > L_{text} \\ L_{back} - C & \text{if } L_{back} < L_{text} \\ L_{back} + C & \text{if } (L_{back} = L_{text}) \text{ and } (L_{text} < 50) \\ L_{back} - C & \text{if } (L_{back} = L_{text}) \text{ and } (L_{text} \geq 50) \end{cases} \quad (3)$$

In the above formula, $L_{back}$ denotes the lightness of the representative color of the background before the change, $L'_{back}$ denotes the lightness of the representative color of the background after the change, $L_{text}$ denotes the lightness of the characters, and C denotes the constant. The constant is set within the value range of the calculated lightness. In the present embodiment, the constant is 15. In a case where the lightness having been calculated using the formula 3 exceeds the value range of the lightness, clipping based on the value range of the lightness is performed. Then, the decoration color is calculated using the following formula 4.

$$\text{DecoColor}_{Lab} = (L'_{back}, a_{back}, b_{back}) \quad (4)$$

In the above formura, $\text{DecoColor}_{Lab}$ denotes the decoration color in the Lab color space, and $a_{back}$ and $b_{back}$ denote chromaticity representing hue and chroma of the representative background color having been converted into the Lab color space.

In S2303, the decoration execution unit 1804 adjusts the decoration color having been calculated in S2302 in such a way as to make the readability evaluation value for the decoration color having been calculated in S2302 and for the character color greater than a threshold. In the present embodiment, in a case where the readability evaluation value for the character color and the decoration color is not greater than the threshold, the lightness of the decoration color is adjusted in such a way as to make the readability evaluation value greater than the threshold. In the present embodiment, by using the following formulae 5 and 6, based on a relationship between the lightness of the decoration color and the lightness of the character color, a change amount obtained by subtracting the readability evaluation value for the character color and the decoration color from the threshold is added to or subtracted from the lightness of the decoration color.

$$\text{diff} = \text{Thre} - |L_{deco} - L_{text}| \quad (5)$$

$$L'_{deco} = \begin{cases} L_{deco} + \text{diff} & \text{if } L_{deco} > L_{text} \\ L_{deco} - \text{diff} & \text{if } L_{deco} < L_{text} \\ L_{deco} + \text{diff} & \text{if } (L_{deco} = L_{text}) \text{ and } (L_{deco} < 50) \\ L_{deco} - \text{diff} & \text{if } (L_{deco} = L_{text}) \text{ and } (L_{deco} \geq 50) \end{cases} \quad (6)$$

In the above formula, Thre denotes the threshold, $L_{deco}$ denotes the lightness of the decoration color before the adjustment, and $L'_{deco}$ denotes the lightness of the decoration color after the adjustment. The threshold is set within the value range of the calculated lightness. The value of the threshold used in S2303 is set to be not less that the value of the threshold having been used in S1903. In the present embodiment, the threshold is set to be 40. In a case where the lightness having been calculated using the formula 6 exceeds the value range of the lightness, clipping based on the value range of the lightness is performed. Then, the decoration color is calculated using the following formula 7.

$$\text{DecoColor}_{Lab} = (L'_{deco}, a_{back}, b_{back}) \quad (7)$$

In a case where the readability evaluation value for the character color and the decoration color is not greater than the threshold even after performing the above processing, an adjustment is made in such a way as to produce a lightness difference in the opposite direction. Specifically, the lightness of the decoration color is calculated using the following formula 8.

$$L''_{deco} = \begin{cases} L_{text} - \text{Thre} & \text{if } L'_{deco} > L_{text} \\ L_{text} + \text{Thre} & \text{if } L'_{deco} \leq L_{text} \end{cases} \quad (8)$$

In the above formula, $L''_{deco}$ denotes the lightness of the calculated decoration color. In a case where the lightness having been calculated using the formula 8 exceeds the value range of the lightness, clipping based on the value range of the lightness is performed.

Then, the decoration color is calculated using the following formula 9.

$$\text{DecoColor}_{Lab} = (L'_{deco}, a_{back}, b_{back}) \quad (9)$$

The decoration color is determined by converting the color space of the decoration color having been calculated as described above into an RGB color space.

In the present embodiment, in the calculation of the decoration color in S2302, the same type of color different in lightness is calculated based on the representative color of the background. However, the method for calculating the same type of color is not limited thereto. For example, the same type of color different in lightness may be calculated based on the character color. In this case, the processing produces a difference in lightness between the characters and the surrounding area around the characters; therefore, similarly to the above case, it is possible to enhance the character readability.

In the present embodiment, in the calculation of the decoration color in S2302, the same type of color different in lightness is calculated based on the representative color of the background. However, the method for calculating the same type of color is not limited thereto. For example, the same type of color different in hue may be calculated based on the representative color of the background. The same type of color different in three-dimensional color vector, without being limited to one element, may be calculated. Also in these cases, the processing produces a difference in lightness between the characters and the surrounding area around the characters; therefore, similarly to the above case, it is possible to enhance the character readability.

For the decoration method of "contour" and "luster", the width of decoration is settable.

The method for setting the width of decoration in the processing for determining decoration parameters in S1906 of FIG. 19 will now be described.

Figure 27:
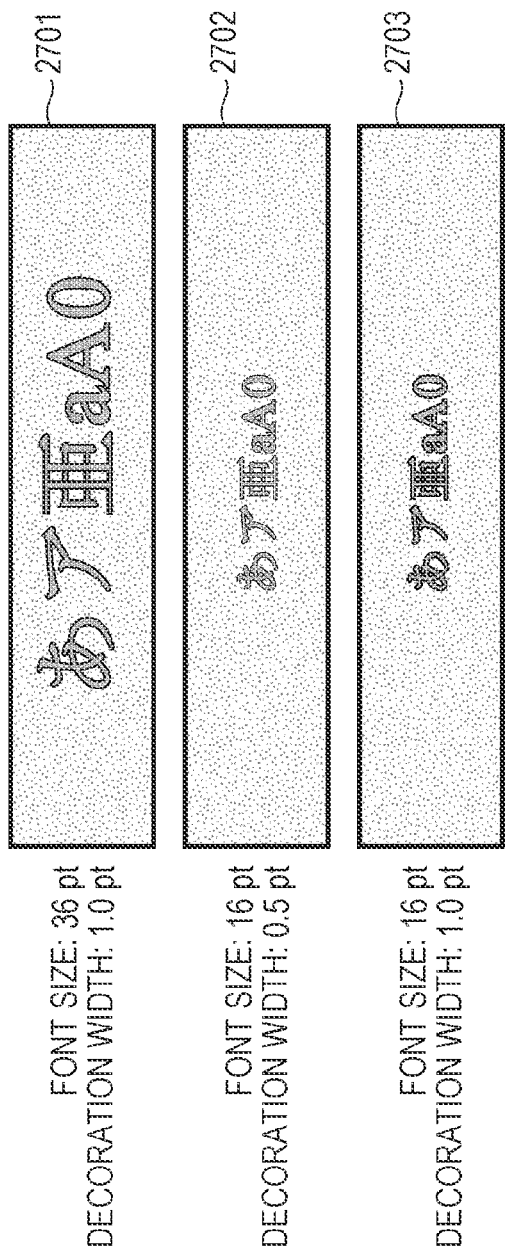
FIG. 27 is a diagram for explaining the influence of the width of decoration on impression.

FIG. 27 is a diagram for explaining the influence of the width of decoration on impression. In a text object 2701, characters having a font size of 36 pt are decorated with contour having a width of 1.0 pt. The value of the font size and decoration width of a text object 2702 is a half of that of the text object 2701. A text object 1703 has the same font size as that of the text object 2702 and has the same decoration width as that of the text object 2701.

As can be seen from a comparison of the text object 2701 and the text object 2703, even with the same decoration width, how the characters look differ depending on the font size, resulting in a different impression. Moreover, as can be seen from a comparison of the text object 2702 and the text object 2703, even with the same font size, how the characters look differ depending on the decoration width, resulting in a different impression. The reason why the impression varies as described here is that the ratio between the thickness of the characters drawn and the thickness of the decoration width varies significantly. Therefore, determining the decoration width depending on the font size makes it possible to decorate characters without changing the impression.

Figure 24:
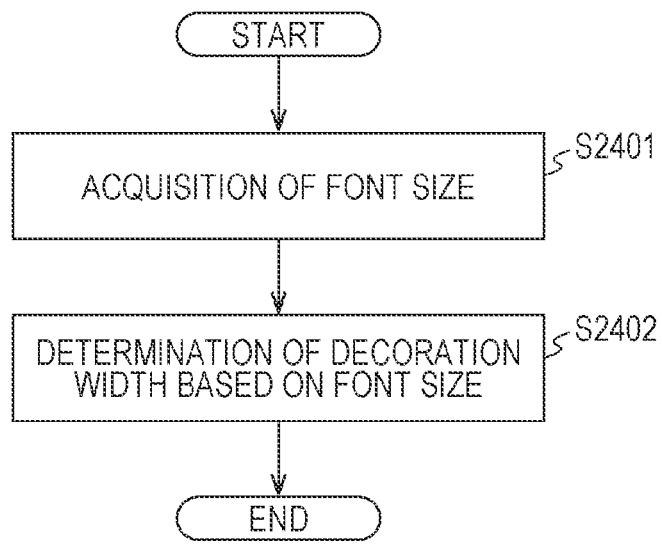
FIG. 24 is a flowchart illustrating decoration width determination processing.
Figure 25:
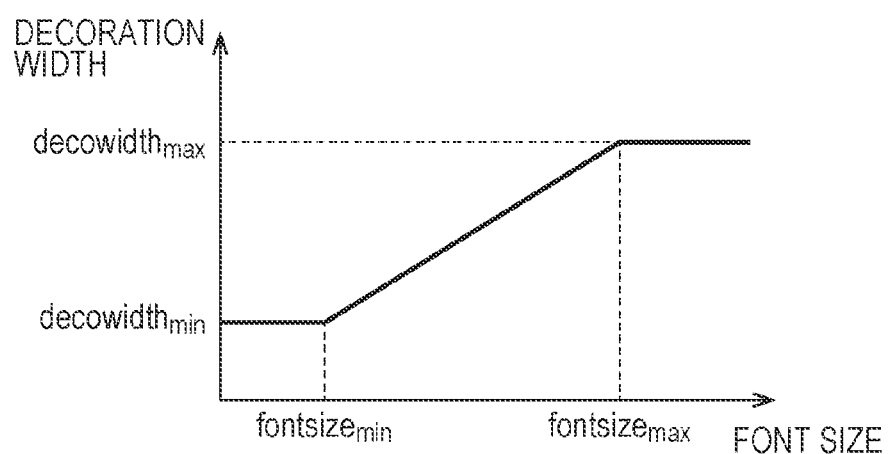
FIG. 25 is a diagram for explaining a method for determining a character width.

With reference to FIGS. 24 and 25, a method for determining the width of decoration will now be described in detail. FIG. 24 is a flowchart illustrating decoration width determination processing in the determination of character parameters in S1906.

In S2401, the decoration execution unit 1804 acquires the font size which the text object has as its metadata.

In S2402, based on the font size of the text object to be decorated, the decoration execution unit 1804 determines the decoration width. FIG. 25 is a diagram for explaining a relationship (hereinafter referred to as "decoration width calculation function") between a font size and a decoration width. In FIG. 25, decowidth$_{min}$ and decowidth$_{max}$ denote the lower limit and the upper limit of decoration width respectively, and fontsize$_{min}$ and fontsize$_{max}$ denote threshold values for setting the lower limit and the upper limit of decoration width respectively. The value of decowidth$_{min}$ is set to be not greater than the value of decowidth$_{max}$. The value of fontsize$_{min}$ is set to be not greater than the value of fontsize$_{max}$. The unit of both of the font size and the decoration width is point (pt).

In the present embodiment, the decoration width is determined based on the decoration width calculation function illustrated in FIG. 25. Specifically, the decoration width is calculated using the following formula 10.

$$Deco\ Width = \begin{cases} deco\ width_{min} & \text{if Font Size} < font\ size_{min} \\ deco\ width_{max} & \text{if Font Size} > font\ size_{max} \\ \dfrac{deco\ width_{max} - deco\ width_{min}}{font\ size_{max} - font\ size_{min}} * Font\ Size & \text{other} \end{cases} \quad (10)$$

In the above formula, FontSize denotes the font size, of the text object, having been acquired in S2401, and DecoWidth denotes the decoration width. Performing the decoration width determination on the basis of the formula 10 makes it possible to set a narrower decoration width as the font size decreases.

The decoration width calculation function is not limited to the example expressed by the formula 10. For example, a simple linear function may be used, or a multidimensional function may be used. It may be stored in the form of a LUT. Any form may be adopted as long as it is possible to define a relationship between the font size and the decoration width.

Figure 26:
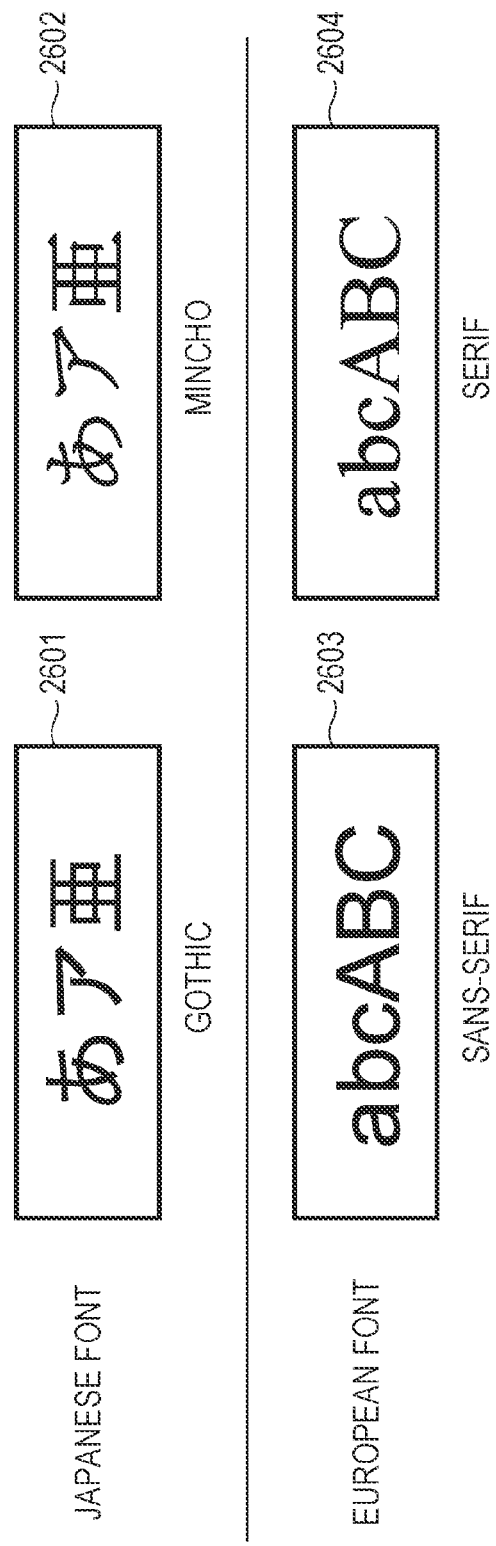
FIG. 26 is a diagram for explaining character thickness based on fonts.

The method for setting the decoration width may be defined depending on the type of the font. FIG. 26 is a diagram for explaining various fonts and the thicknesses of characters drawn in the same font size. Gothic 2601 and Sans-serif 2603 are fonts that have a uniform character thickness. By contrast, Mincho 2602 and Serif 2604 are fonts whose character thickness is not uniform; they are thinner than Gothic 2601 and Sans-serif 2603. Therefore, it is desirable to use a relation of a gentler slope for Mincho 2602 and Serif 2604 than for Gothic 2601 and Sans-serif 2603. This can be realized by, for example, multiplying, by 0.5, DecoWidth calculated for the Gothic font by using the formula 10 and then by using the multiplication-result value. As described here, by defining a decoration width calculation function that differs depending on a font, it is possible to set the width of decoration appropriately irrespective of the font type.

The method for setting the decoration width may be defined depending on the color of decoration. There exist expansive colors and contractive color. Some colors tend to look expanded. Other colors tend to look contracted. Therefore, it is desirable to use a relation of a gentler slope when the decoration color is an expansive color than when the decoration color is a contractive color. This can be realized by, for example, multiplying, by 0.5, DecoWidth calculated for a case where the decoration color is a contractive color by using the formula 10 and then by using the multiplication-result value. As described here, by defining a decoration width calculation function that differs depending on a decoration color, it is possible to set the width of decoration appropriately irrespective of the decoration color.

The decoration width determination processing described above ends by completing the above process.

Referring back to FIG. 19, in the present embodiment, the processing performed by the text decoration unit 1206 finishes when the processing from S1901 to S1906 has been executed for all of text objects whose type of metadata is "title" among the text objects. The text decoration unit 1206 outputs the decoration-done skeleton data, namely, poster data for which all steps of layout processing have been completed, to the impression estimation unit 218.

In the present embodiment, the processing is executed for text objects whose type of metadata is "title" among the text objects. However, the scope of the present disclosure is not limited to this example. For example, plural types of text objects, including "sub-title", may be the target of processing. All of the text objects may be the target of processing. By this means, it is possible to perform type-by-type control to cover every readability-important text object.

Though the difference in lightness between the character (s) and the surrounding area around the character(s) is used as the readability evaluation value in the present embodiment, a color difference between the character(s) and the surrounding area around the character(s) may be used. For example, a difference in hue may be used, or a difference in three-dimensional vector in a L*a*b* color space may be used. In this case, whether to perform character decoration or not can be switched based on whether the color difference is distinguishable or not.

In the present embodiment, tile division is performed on the text object in S1901; however, the tile division is not indispensable. In this case, for example, the readability evaluation value is calculated using the lightness of the background of the text object as a whole. This makes it possible to make the processing load lighter than when the tile division is performed. A character-thickened area may be calculated, and the readability evaluation value may be calculated using the lightness of the background of this area. This makes it possible to make the processing load lighter because it becomes unnecessary to see the entire text object.

Though the processing is performed for the text object in the present embodiment, the processing may be performed on a line-by-line basis or a character-by-character basis in the text object. This makes it possible to make the number of characters to which character decoration is applied smaller than in a case where the processing is performed for the entire text object.

In S1308, the layout unit 217 determines whether all pieces of poster data have been created or not. In a case where poster data has been created for every combination of the skeletons, the color arrangement patterns, and the fonts, the layout processing ends, and the processing proceeds to S911. In a case where all pieces of poster data have not been created yet, the process returns to S1301, and poster data for a yet-to-be-created combination is created.

The foregoing is an explanation of S910. The description returns to FIG. 9.

In S911, the impression estimation unit 218 performs rendering on each piece of poster data acquired from the layout unit 217, and associates, with the poster data, estimated impression obtained by estimating the impression of the poster image having been subjected to rendering. By this means, it is possible to assess not only the impression of the individual elements of the poster such as the color arrangement and the layout but also the final impression of the layout-performed poster, including the image and the characters. For example, since the layout differs from one skeleton to another, even when the same color-arrangement pattern is designated, which colors are actually used in which area sizes differs. For this reason, it is necessary to assess the final impression of the poster, not only the tendency of the individual impression of the color-arrangement pattern and the skeleton.

In S912, based on the poster data and the estimated impression acquired from the impression estimation unit 218, the poster selection unit 219 selects posters to be presented to the user. In the present embodiment, the poster selection unit 219 selects posters whose distance between the aimed impression and the estimated impression is not greater than a predetermined threshold. If the number of posters selected is not enough for "the number of those to be created" designated by the poster creation condition designating unit 201, to make up for the insufficiency, the poster selection unit 219 makes an additional selection in an ascending order of the values of distance between the aimed impression and the estimated impression of the poster. Though the poster selection unit 219 performs an additional selection for making up for the insufficiency in the number of posters in the present embodiment, the scope of the present disclosure is not limited thereto. For example, if the number of posters selected by the poster selection unit 219 is not enough for the number of those to be created, a message for notification of the insufficiency may be displayed on the preview screen 601. Alternatively, the poster selection unit 219 may perform an additional selection for making up for the insufficiency in the number of posters, and posters whose distance between the aimed impression and the estimated impression is not greater than the threshold and posters whose distance between the aimed impression and the estimated impression is greater than the threshold may be displayed on the poster preview screen 601 in a distinguishable manner. As another example, if the number of posters selected is not enough, the process may be returned to S903, and the number of skeletons, the number of color arrangement patterns, and the number of fonts that are selected may be increased.

In S913, the poster display unit 205 performs rendering on the poster data selected by the poster selection unit 219, and outputs poster images to the display 105. That is, the preview screen 601 illustrated in FIG. 6 is displayed.

The foregoing is an explanation of the flow of the processing for poster creation in response to receiving designation of impression by the user.

As explained above, with the present embodiment, it is possible to create a poster that expresses a user-demanded impression. More specifically, in the present embodiment, it is possible to create a plurality of poster candidates that offer variations in accordance with the aimed impression by, based on the aimed impression, selecting poster-constituting elements such as skeletons, color arrangement patterns, fonts, and character decoration and by combining them.

Moreover, estimating the impression of a poster as a whole and selecting a poster close to the aimed impression from among a group of poster candidates makes it possible to create a poster whose impression as a whole, not only individual elements thereof, is in accordance with what is intended by the user. More specifically, for example, in the present embodiment, suppose that the aimed impression is designated on the app screen 501 to have a value of a sense of luxury of −1 and a value of a sense of affinity of +1, with each of a sense of dynamism and a sense of massiveness OFF. When this setting is designated, for example, the poster image 602 on the poster preview screen 601 is created with estimated impression close to the aimed impression, for example, with a value of a sense of luxury of −1.2, a value of a sense of affinity of +0.9, a value of a sense of dynamism of +0.2, and a value of a sense of massiveness of −1.3. The value of a sense of dynamism and the value of a sense of massiveness may be any value because control is not performed for these items, for which the aimed impression is OFF. Moreover, with the present embodiment, it is possible to enhance the readability of characters by performing character decoration.

Modification Examples of First Embodiment

In the first embodiment, the aimed impression is set using the impression setting slider bars 508 to 511 of the app screen 501. However, the method for setting the aimed impression is not limited to the foregoing example.

FIGS. 16A to 16D are diagrams illustrating examples of a UI for setting an aimed impression. FIG. 16A illustrates an example of setting an aimed impression using a UI on a radar chart. By operating a handle 1601 on the radar chart, the user is able to set an aimed impression on each axis. The aimed impression designating unit 204 acquires the aimed impression such that a value of −2 is acquired when the handle 1601 is located at the center of the UI and such that a value of +2 is acquired when at the outermost point thereof. In FIG. 19A, the aimed impression has a value of a sense of luxury of +0.8, a value of a sense of affinity of +1.1, a value of a sense of dynamism of −0.1, and a value of a sense of massiveness of −0.7. As described here, the aimed impression may be set with a decimal. The radar chart illustrated in FIG. 16B shows an example in which a part of the items of aimed impression is OFF. For example, by double-clicking the handle 1601 using the pointing device 107, the user is able to set, into OFF, the aimed impression on the axis corresponding to this handle. By clicking the axis 1602 on the radar chart using the pointing device 107, the user is able to set the disabled item of the aimed impression back into ON. In FIG. 16B, a sense of dynamism is OFF, and, except for this item of impression, the settings of the aimed impression illustrated therein are the same as those of FIG. 16A.

FIG. 16C illustrates an example of image-based setting of an aimed impression, instead of word-based setting. Poster images 1603 to 1607, in each of which the value of any one of the items of impression is large, are arranged in a sample poster display area 1603. A checkbox 1608 is displayed on each of these poster images. The user is able to choose one, or more, that the user thinks is close to the poster that the user wants to create, by clicking it using the pointing device 107 to turn its checkbox 1608 ON. The aimed impression designating unit 204 determines an aimed impression by looking up the impression corresponding to the poster image that is in a chosen state. FIG. 16D is a table showing impressions corresponding to the poster images 1604 to 1607 illustrated in FIG. 16C and a final aimed impression. For example, suppose that the poster images 1604 and 1607 are in a chosen state as illustrated in FIG. 16C. In this case, the aimed impression designating unit 204 determines, as the aimed impression, an impression 1613 that is a synthesis of respective impressions 1609 and 1612 of them. In this example, the aimed impression is determined by adopting the greater (greatest) absolute value among the respective values of impression corresponding to the chosen poster images. Though an example of presenting poster images each having the maximum value of its item of impression is described above, the scope of the present disclosure is not limited to this example. A poster image(s) having a plurality of large impression item values may be used. A plurality of poster images the number of which is greater than the number of items of impression may be presented. With this modification example, the user is able to designate the aimed impression intuitively while seeing actual poster images, instead of word-based designation.

Second Embodiment

In the first embodiment, an example of creating a poster with guaranteed readability by, based on the aimed impression, selecting a skeleton(s), a color arrangement pattern(s), and a font(s), which are constituting elements of a poster, and controlling character decoration has been described. In a second embodiment, an example of creating a poster with guaranteed readability by, based on the aimed impression, selecting a color arrangement pattern(s) and performing character color assignment will be described. More specifically, candidates for a color to be assigned to a text object are defined, and a color that best enhances its readability among the candidate colors is assigned to the text object. By this means, it is possible to create a poster that offers high readability while expressing a user-demanded impression.

Figure 28:
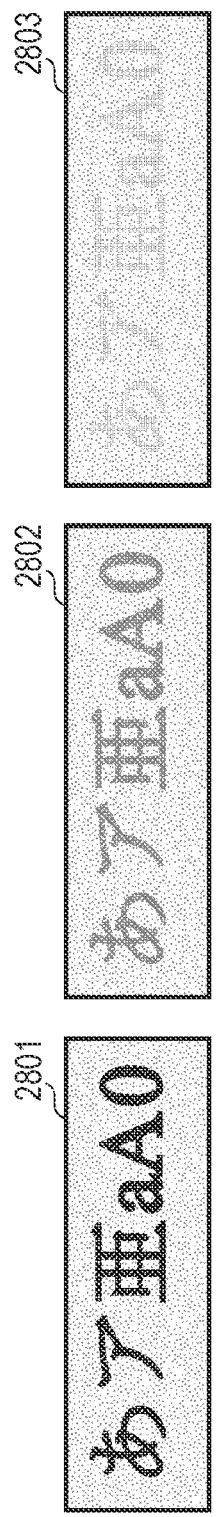
FIG. 28A is a diagram for explaining an effect of the second embodiment.
FIG. 28B is a diagram for explaining the effect of the second embodiment.

FIGS. 28A and 28B are diagrams for explaining an effect of the second embodiment. FIG. 28A illustrates candidates for a color to be assigned to a text object. In FIG. 28A, there are three candidate colors, namely, Color 1, Color 2, and Color 3. Color 1, Color 2, and Color 3 are acquired based on the aimed impression. FIG. 28B illustrates an example of assignment of each candidate color to a text object. Color 1 is assigned to a text object 2801. Color 2 is assigned to a text object 2802. Color 3 is assigned to a text object 2803. In the present embodiment, when there are plural candidates for a color to be assigned to a text object, a color that best enhances its readability among the candidate colors is assigned to the text object. In the example illustrated in FIG. 28B, the text object 2801, to which Color 1 is assigned, has the highest readability; therefore, Color 1 is assigned to the text object. In the present embodiment, among the colors acquired based on the aimed impression, the color that realizes the highest readability is assigned to the text object. Therefore, it is possible to create a poster that offers high readability while expressing a user-demanded impression.

Figure 31:
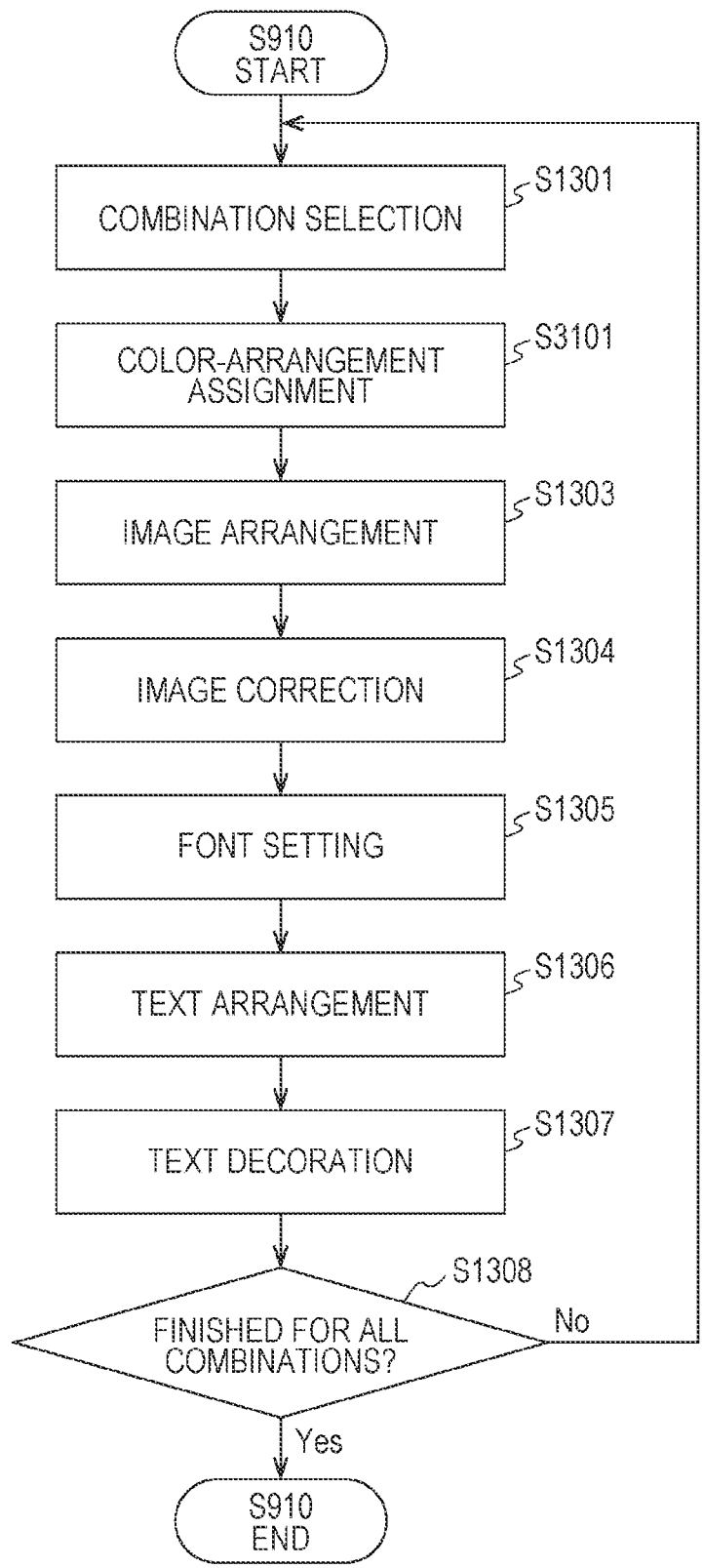
FIG. 31 is a flowchart illustrating layout processing.

The software block diagram of the present embodiment is the same as that of FIG. 2. Therefore, it is not explained here.
Flow of Processing FIG. 31 is a flowchart illustrating processing of the poster creation unit 210 of the poster creation application according to the present embodiment. Except for S3101, the steps of FIG. 31 are the same as those of FIG. 13. An explanation of the same steps is omitted here.

In S3101, the color-arrangement assigning unit 1201 assigns the color arrangement pattern acquired from the color arrangement pattern selection unit 215 to the skeleton acquired from the skeleton selection unit 214.

More specifically, the color to be assigned to the text object whose type of metadata is "title", among the text objects, is determined while evaluating its character readability. The method for color pattern assignment to the text objects whose type of metadata is not "title" among the text objects, and to those other than the text objects, is the same as that of the first embodiment. Therefore, an explanation is omitted in the present embodiment.

Figure 29:
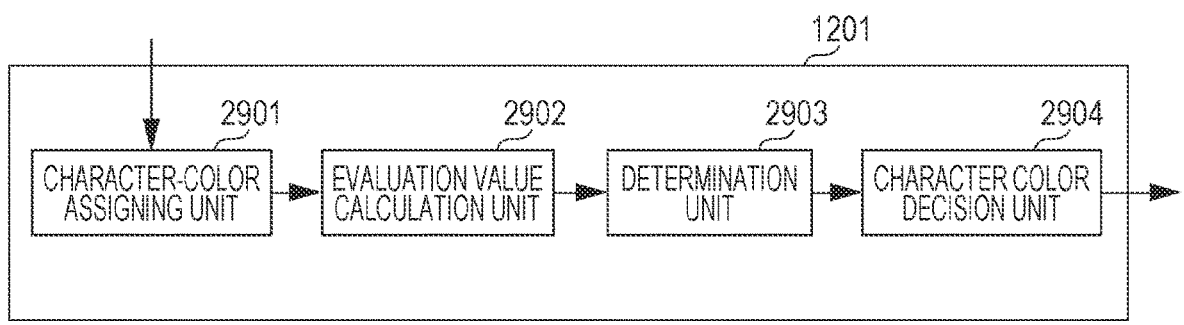
FIG. 29 is a software block diagram for explaining a color-arrangement assigning unit in detail.
Figure 30:
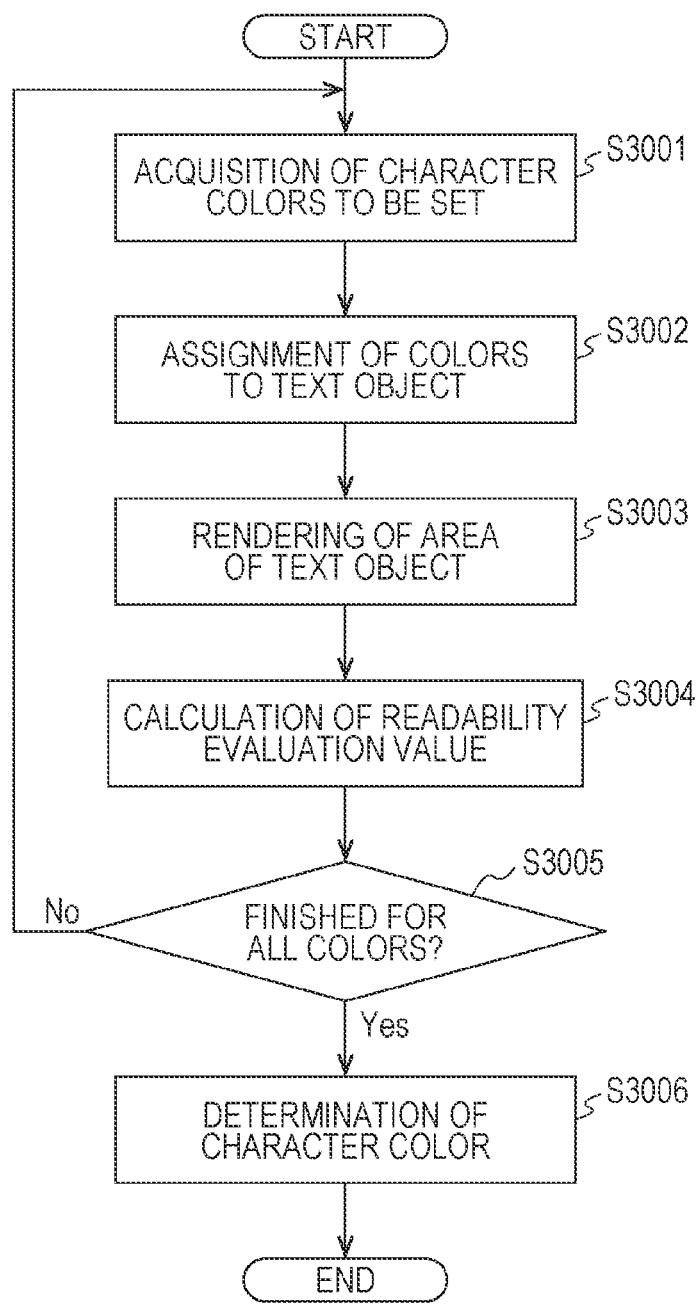
FIG. 30 is a flowchart illustrating character color determination processing.

With reference to FIGS. 29 and 30, processing performed by the color-arrangement assigning unit 1201 will now be described in detail. FIG. 29 is an example of a software block diagram for explaining the color-arrangement assigning unit 1201 in detail. FIG. 30 is a flowchart for explaining processing performed by the color-arrangement assigning unit 1201 in detail.

In S3001, a character-color assigning unit 2901 acquires colors to be assigned to the text object. In the present embodiment, the colors included in the color arrangement pattern acquired from the color arrangement pattern selection unit 215 are defined as the character candidate colors, and one color is selected from among the character candidate colors. The method for defining the character candidate colors is not limited thereto. For example, a plurality of colors obtained by adding black and white to the colors included in the color arrangement pattern may be defined as the character candidate colors. This makes not only the colors included in the color arrangement pattern but also basic colors used for characters settable.

In S3002, the character-color assigning unit 2901 assigns the colors having been acquired in S3001 to the text object.

In S3003, an evaluation value calculation unit 2902 performs rendering of the area where the text object is arranged, inclusive of other objects arranged on the background.

In S3004, the evaluation value calculation unit 2902 evaluates the readability of characters. In the present embodiment, the readability evaluation value for the character and the background is calculated. Since the method for calculating the readability evaluation value is the same as that of the first embodiment, an explanation is omitted in the present embodiment. The calculated readability evaluation value is stored in association with the colors having been acquired in S3001.

In S3005, a determination unit 2903 determines whether the readability evaluation value has been calculated for all of colors included in the character candidate colors having been defined in S1601. If it is determined that the calculation of the readability evaluation value has finished for all of the colors, the process proceeds to S3006. If it is determined that the calculation of the readability evaluation value has not finished for all of the colors yet, the process from S3001 is repeated.

In S3006, a character color decision unit 2904 decides, as the character color of the text object, the color associated with the greatest readability evaluation value among the readability evaluation values having been calculated in S3004.

In the present embodiment, the processing is executed for text objects whose type of metadata is "title" among the text objects. However, the scope of the present disclosure is not limited to this example. For example, plural types of text objects, including "sub-title", may be the target of processing. All of the text objects may be the target of processing. By this means, it is possible to perform type-by-type control to cover every readability-important text object.

In a case where any text object whose type of metadata is not "title" among the text objects is also included in the target of processing, control may be performed to assign colors different from type to type.

For example, in a case where the text objects whose type of metadata is "title" and "sub-title" are included in the target of processing and where Color 1 has been assigned to the text object whose type of metadata is "title" as the result of character color determination processing illustrated in FIG. 30, the color that is selected from among those other than Color 1 and realizes the highest readability may be assigned to the text object whose type of metadata is "sub-title". By this means, it is possible to apply type-by-type contrast.

As explained above, in the present embodiment, the color pattern to be used for creating the poster is selected in accordance with the aimed impression, and, among the colors included in the selected color arrangement pattern, the color that realizes the highest readability is assigned to the text object. By this means, it is possible to create a poster that gives an impression close to the aimed impression while maintaining the character readability.

With the embodiment described above, it is possible to appropriately create a poster that expresses an impression intended by a user, even in a case where character decoration is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104047, filed Jun. 28, 2022, which is hereby incorporated by reference herein in its entirety.

What is claimed is:

1. An information processing apparatus, comprising:
at least one processor; and
a memory that stores a program which, when executed by the at least one processor, causes the at least one processor to function as:
a character acquisition unit configured to acquire characters;
a receiving unit configured to receive an input of aimed impression; and
a poster creation unit configured to, based on the characters and the aimed impression, create a poster, wherein
based on the aimed impression, the poster creation unit determines a method for decorating the characters, and
based on the determined method for decorating the characters and based on the characters, the poster creation unit creates the poster,
wherein the input of the aimed impression is received from a user that selects one value from a range of values for at least one impression from a group of four impressions that comprise the aimed impression,
wherein the group of four impressions includes luxury, affinity, dynamism, and massiveness,
wherein a skeleton corresponding to a Euclidean distance based on the selected one value from a range of values for luxury, the selected one value from a range of values for affinity, the selected one value from a range of values for dynamism, and the selected one value from a range of values for massiveness is selected from among a plurality of pre-stored skeletons, and
wherein the poster is created based on the selected skeleton corresponding to the Euclidean distance.

2. The information processing apparatus according to claim 1, wherein
a difference between an impression given by the poster created by the poster creation unit and the aimed impression is not greater than a predetermined threshold.

3. The information processing apparatus according to claim 1, wherein
based on the aimed impression and readability of the characters, the poster creation unit determines the method for decorating the characters, and
based on the determined method for decorating the characters and based on the characters, the poster creation unit creates the poster.

4. The information processing apparatus according to claim 3, wherein the at least one processor further functions as:
a readability evaluation unit configured to evaluate the readability of the characters included in the poster, wherein
the poster creation unit determines the method for decorating the characters such that the readability is not less than a predetermined threshold, and
based on the determined method for decorating the characters and based on the characters, the poster creation unit creates the poster.

5. The information processing apparatus according to claim 4, wherein
the readability is a difference between lightness of the characters and lightness of a background area.

6. The information processing apparatus according to claim 4, wherein
the readability is a difference between a color of the characters and a color of a background area.

7. The information processing apparatus according to claim 1, wherein the at least one processor further functions as:

an image acquisition unit configured to acquire an image, wherein based on the image, the characters, and the aimed impression, the poster creation unit creates the poster.

8. The information processing apparatus according to claim 1, wherein the method for decorating the characters includes at least one of contour, luster, or shadow.

9. The information processing apparatus according to claim 1, wherein the at least one processor further functions as:

a display control unit configured to display a screen for receiving the input of the aimed impression, wherein the receiving unit receives the input of the aimed impression via the screen.

10. An information processing apparatus control method, comprising:

acquiring characters;

receiving an input of aimed impression; and creating a poster, based on the characters and the aimed impression, wherein in creating the poster, based on the aimed impression, a method for decorating the characters is determined, and based on the determined method for decorating the characters and based on the characters, the poster is created, wherein the input of the aimed impression is received from a user that selects one value from a range of values for at least one impression from a group of four impressions that comprise the aimed impression, wherein the group of four impressions includes luxury, affinity, dynamism, and massiveness, wherein a skeleton corresponding to a Euclidean distance based on the selected one value from a range of values for luxury, the selected one value from a range of values for affinity, the selected one value from a range of values for dynamism, and the selected one value from a range of values for massiveness is selected from among a plurality of pre-stored skeletons, and wherein the poster is created based on the selected skeleton corresponding to the Euclidean distance.

11. A non-transitory computer-readable storage medium storing a program configured to cause a computer of an information processing apparatus to function as:

a character acquisition unit configured to acquire characters;

a receiving unit configured to receive an input of aimed impression; and a poster creation unit configured to, based on the characters and the aimed impression, create a poster, wherein based on the aimed impression, the poster creation unit determines a method for decorating the characters, and based on the determined method for decorating the characters and based on the characters, the poster creation unit creates the poster, wherein the input of the aimed impression is received from a user that selects one value from a range of values for at least one impression from a group of four impressions that comprise the aimed impression, wherein the group of four impressions includes luxury, affinity, dynamism, and massiveness, wherein a skeleton corresponding to a Euclidean distance based on the selected one value from a range of values for luxury, the selected one value from a range of values for affinity, the selected one value from a range of values for dynamism, and the selected one value from a range of values for massiveness is selected from among a plurality of pre-stored skeletons, and wherein the poster is created based on the selected skeleton corresponding to the Euclidean distance.

* * * * *